(12) United States Patent
Tsukamoto

(10) Patent No.: US 12,293,500 B2
(45) Date of Patent: May 6, 2025

(54) IMAGE INSPECTION DEVICE, IMAGE FORMING DEVICE, AND COMPUTER-READABLE RECORDING MEDIUM STORING A PROGRAM

(71) Applicant: KONICA MINOLTA, INC., Tokyo (JP)

(72) Inventor: Yasumasa Tsukamoto, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/429,819

(22) Filed: Feb. 1, 2024

(65) Prior Publication Data

US 2024/0249400 A1    Jul. 25, 2024

Related U.S. Application Data

(63) Continuation of application No. 17/381,463, filed on Jul. 21, 2021, now Pat. No. 11,922,612, which is a
(Continued)

(30) Foreign Application Priority Data

Aug. 13, 2018  (JP) ................. 2018-152187

(51) Int. Cl.
G06F 3/12     (2006.01)
G06T 7/00     (2017.01)
H04N 1/00     (2006.01)

(52) U.S. Cl.
CPC ........... G06T 7/0002 (2013.01); G06F 3/121 (2013.01); G06F 3/1234 (2013.01);
(Continued)

(58) Field of Classification Search
None
See application file for complete search history.

(56) References Cited

U.S. PATENT DOCUMENTS 9,386,174 B2    7/2016   Ueda et al.
2013/0136315 A1   5/2013   Kawamoto
(Continued)

FOREIGN PATENT DOCUMENTS

JP    2014144627 A    8/2014
JP    2014184649 A    10/2014
(Continued)

OTHER PUBLICATIONS

Office Action (Notice of Reasons for Refusal) issued on May 24, 2022, by the Japanese Patent Office in corresponding Japanese Patent Application No. 2018-152187, and an English Translation of the Office Action. (9 pages).
(Continued)

Primary Examiner — Dov Popovici
(74) Attorney, Agent, or Firm — Buchanan Ingersoll & Rooney PC

(57) ABSTRACT

An image inspection device which enables the user to know the cause of an abnormality in a read image. The image inspection device includes: an image reader outputting a read image generated by reading an image formed on a sheet of paper by an image forming device; an image inspection section inspecting the read image and outputting an inspection result which takes the read image determined not to have an abnormality as a normal image and the read image determined to have the abnormality as an abnormal image; an inspection result report generator generating an inspection result report according to the read image and the inspection result; an inspection result report output section outputting the inspection result report; and a controller performing control to cause the inspection result report output section to output the normal image and the abnormal image in a comparable manner.

24 Claims, 21 Drawing Sheets

Related U.S. Application Data continuation of application No. 16/451,058, filed on Jun. 25, 2019, now Pat. No. 11,094,048.

(52) U.S. Cl.
CPC ..... *H04N 1/00015* (2013.01); *H04N 1/00029* (2013.01); *H04N 1/00063* (2013.01); *H04N 1/00082* (2013.01)

(56) References Cited

U.S. PATENT DOCUMENTS

| | | | |
|---|---|---|---|
| 2013/0208290 A1* | 8/2013 | Ikari | H04N 1/00633 358/1.12 |
| 2014/0285852 A1 | 9/2014 | Aikawa et al. | |
| 2015/0220809 A1 | 8/2015 | Kawabata et al. | |
| 2015/0221077 A1* | 8/2015 | Kawabata | G06T 7/337 382/141 |
| 2019/0082943 A1 | 3/2019 | Mitsunaga | |
| 2019/0238685 A1 | 8/2019 | Tsukamoto | |
| 2019/0392225 A1 | 12/2019 | Chihara et al. | |
| 2020/0051231 A1 | 2/2020 | Tsukamoto | |
| 2020/0294048 A1 | 9/2020 | Ye | |
| 2021/0266422 A1 | 8/2021 | Kikuta et al. | |
| 2022/0012867 A1 | 1/2022 | Tsukamoto | |

FOREIGN PATENT DOCUMENTS

| | | |
|---|---|---|
| JP | 2014185941 A | 10/2014 |
| JP | 2014219867 A | 11/2014 |
| JP | 2016156645 A | 9/2016 |
| JP | 2017126294 A | 7/2017 |
| JP | 2017202627 A | 11/2017 |
| WO | 2015114833 A1 | 8/2015 |

OTHER PUBLICATIONS

Office Action (Notice of Reasons for Refusal) issued on Nov. 29, 2022, by the Japanese Patent Office in corresponding Japanese Patent Application No. 2022-115837, and an English Translation of the Office Action. (8 pages).

Notice of Reasons for Refusal issued on Aug. 30, 2022, by the Japanese Patent Office in corresponding Japanese Patent Application No. 2022-115837 and an English translation of the Notice. (9 pages).

* cited by examiner

INSPECTION LEVEL SETTING

SELECT INSPECTION LEVEL FOR DETERMINATION AS STAIN.

Level1 : 0.1 mm OR MORE
Level2 : 0.3 mm OR MORE
Level3 : 0.5 mm OR MORE
Level4 : 0.8 mm OR MORE
Level5 : 1.0 mm OR MORE
Level6 : 1.5 mm OR MORE
Level7 : 3 mm OR MORE

- Level 1
- Level 2
- Level 3
- Level 4
- Level 5
- Level 6
- Level 7

[ OK ]  [ Cancel ]

FIG. 13

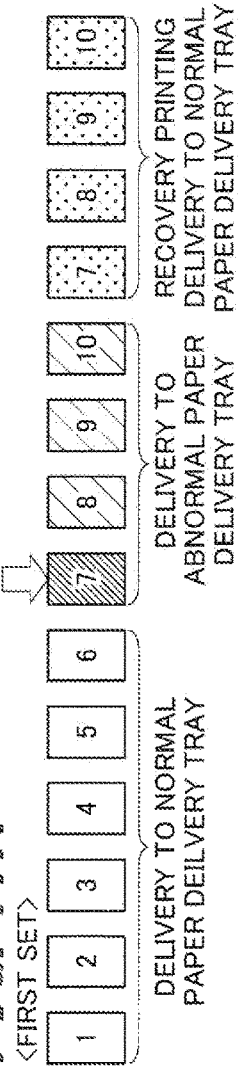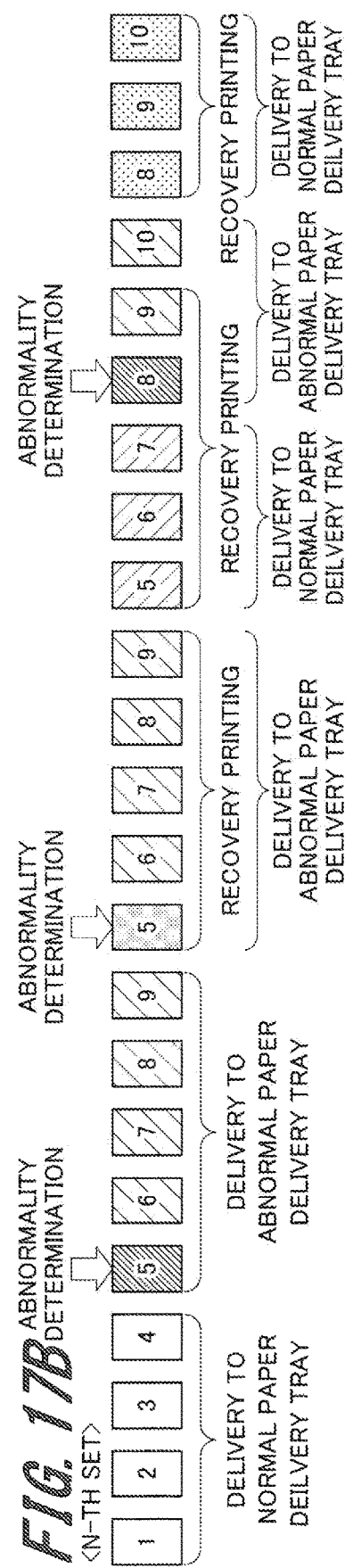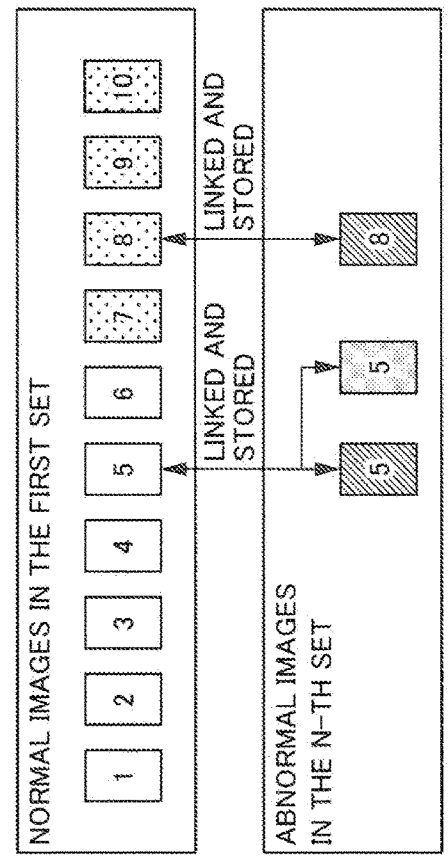

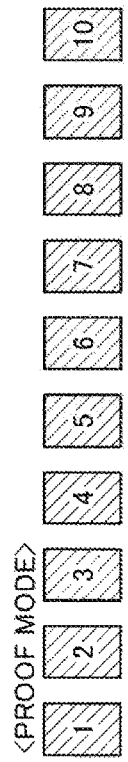
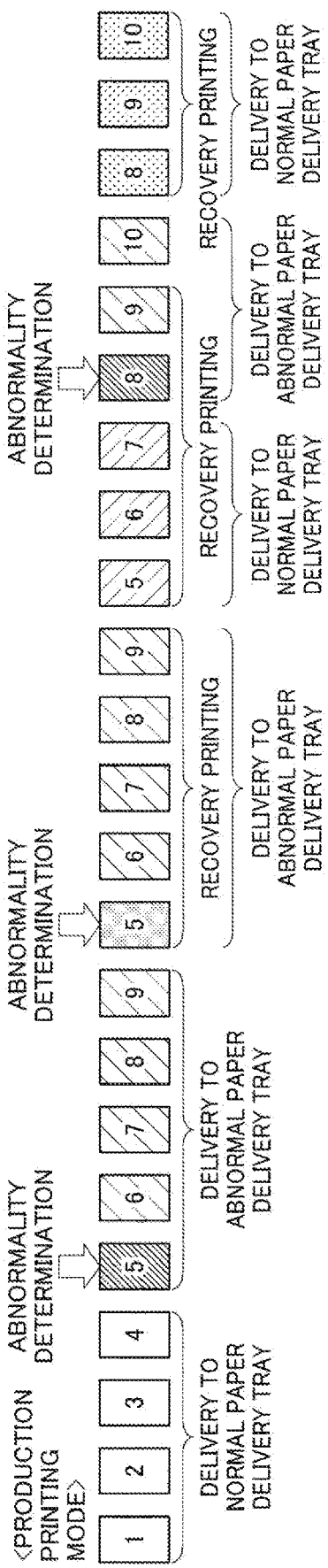

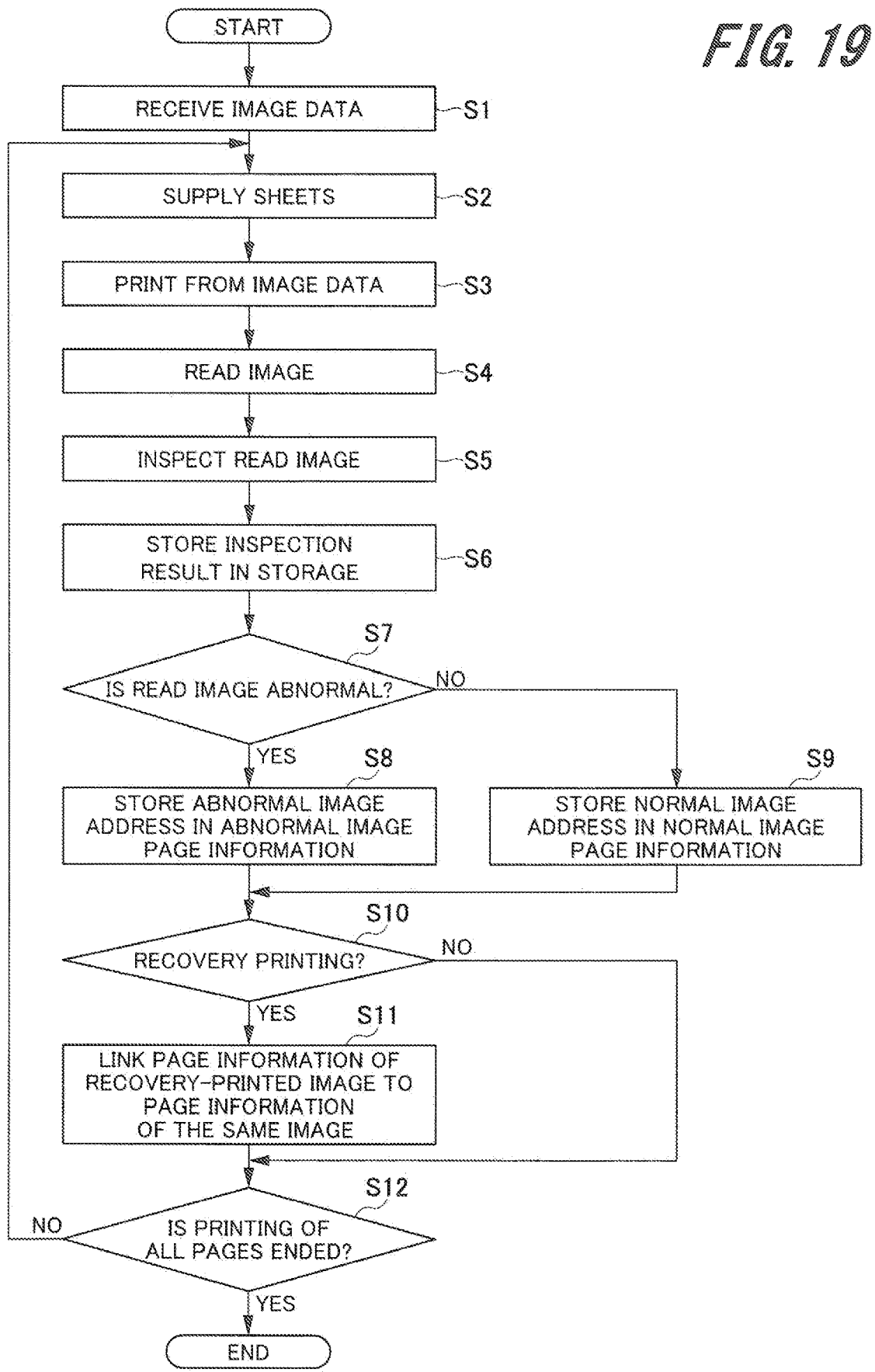

IMAGE INSPECTION DEVICE, IMAGE FORMING DEVICE, AND COMPUTER-READABLE RECORDING MEDIUM STORING A PROGRAM

CROSS-REFERENCE TO RELATED APPLICATIONS

The present application is a continuation of U.S. patent application Ser. No. 17/381,463, filed on Jul. 21, 2021, which is a continuation of U.S. patent application Ser. No. 16/451,058, filed on Jun. 25, 2019, which claims priority of Japanese Patent Application No. 2018-152187, filed on Aug. 13, 2018. The entire disclosures of U.S. patent application Ser. No. 17/381,463; U.S. patent application Ser. No. 16/451,058 and Japanese Patent Application No. 2018-152187 are incorporated herein by reference in their entirety.

BACKGROUND

Technological Field

The present invention relates to an image inspection device, an image forming device and a computer-readable recording medium storing a program.

Description of the Related Art

In the past, an inspection has been made on a sheet of paper on which an image has been formed (printed) by an image forming device, in order to check whether a correct image has been formed or whether it has an image forming defect such as a stain or image registration error or not.

The inspection is intended to confirm that the image printed on the sheet of paper satisfies the quality expected by the creator (user) of image forming data (for example, an original image). The inspection items are printing position, image stains, image scraping, density unevenness, streaks, gloss unevenness and so on.

Formerly, the user conducted a visual inspection of the image printed on a sheet of paper. However, when a large number of pages or copies are printed, visual inspection by the user requires a large number of man hours, which means that this approach has limitations.

For this reason, an image inspection device which inspects the image generated by reading the image formed on a sheet of paper with a scanner, etc. (hereinafter called "read image") has been used to check for an image forming defect. Some of such image inspection devices have the function to display an inspection result to enable the user to know the existence/nonexistence of an image forming defect, etc. The displayed inspection result includes not only the existence/nonexistence of an image forming defect but also image information on the inspected sheet.

For example, the inspection result shows the spot (position) of an image forming defect in the read image. However, when the user compares the inspection result with the image forming data, the user can know the spot concerned but may be unable to identify the cause of the image forming defect.

Patent Literature 1 (JP-A-2017-202627) discloses a technique which compares a read image with a corresponding original image and prints a defect detection report on a sheet. In the defect detection report, the read image and original image are formed on the sheet and the result of detection of an image forming defect in the read image is printed.

FIG. 1 is an explanatory drawing which shows an example of a defect detection report 58.

The defect detection report 58 includes a normal image 51 and a defect-detected image 52 which are printed on a sheet. The normal image 51 is generated from the original image and the defect-detected image 52 is generated from a read image with an image forming defect. The normal image 51 and the defect-detected image 52 are generated here in smaller size than the printed size of the original image and read image. The defect-detected image 52 has defects as a color firefly-like spot 53 and a white streak 54. The defects are enclosed by red circles 55 and 56.

CITATION LIST

Patent Literature

Patent Literature 1: JP-A-2017-202627

SUMMARY

However, the normal image 51 generated from the original image as disclosed in Patent Literature 1 is merely an ideal image. The image formed on a sheet actually by the image forming device on which various settings have been made may be different from the original image. When the normal image 51 generated from the original image is used for comparison with the read image, whether the defect detected in the read image is allowable or not is unclear in some cases. In addition, if the difference between the normal image 51 and the read image is large, there is the possibility that all the read images are detected as defective.

The present invention has been made in view of the above circumstances and has an object to enable the user to easily recognize an abnormality contained in a read image.

To achieve at least the abovementioned object, according to an aspect of the present invention, an image inspection device reflecting one aspect of the present invention comprises: an image reader which outputs a read image generated by reading an image formed on a recording material by an image forming device; an image inspection section which inspects the read image and outputs an inspection result which takes the read image determined not to have an abnormality as a normal image and the read image determined to have the abnormality as an abnormal image; an inspection result report generator which generates an inspection result report according to the read image and the inspection result; an inspection result report output section which outputs the inspection result report; and a controller which performs control to cause the inspection result report output section to output the normal image and the abnormal image in a comparable manner.

The above image inspection device is one mode of the present invention, and an image forming device and a computer-readable recording medium storing a program, each reflecting one aspect of the present invention, are configured in the same manner as the above image inspection device.

BRIEF DESCRIPTION OF THE DRAWINGS

The advantages and features provided by an embodiment of the invention will become more fully understood from the detailed description given hereinbelow and the appended drawings which are given by way of illustration only, and thus are not intended as a definition of the limits of the present invention:

FIG. 13 is an explanatory drawing which shows a display example of the inspection level setting screen according to the embodiment of the present invention;

FIG. 17A is a drawing which shows an example of the sheets in the first collated set according to the embodiment of the present invention;

FIG. 17B is a drawing which shows an example of the sheets in the N-th collated set according to the embodiment of the present invention;

FIG. 17C is a drawing which shows an example of the normal read images determined as normal in the first collated set and the abnormal read images determined as abnormal in the N-th collated set according to the embodiment of the present invention;

FIG. 18A is a drawing which shows an example of reference images of ten pages which are generated from read images in the proof mode according to the embodiment of the present invention;

FIG. 18B is a drawing which shows an example of the read images of sheets printed in the production printing mode and the sheets treated as spoilage according to the embodiment of the present invention;

FIG. 19 is a flowchart which shows an example of the process to link normal image page information and abnormal image page information according to the embodiment of the present invention.

DETAILED DESCRIPTION OF EMBODIMENTS

Hereinafter, one embodiment of the present invention will be described with reference to the drawings. However, the scope of the invention is not limited to the disclosed embodiment. In the specification and the appended drawings, the constituent elements which have substantially the same functions or structures are designated by the same reference signs and repeated description thereof is omitted.

EMBODIMENT

Example of the General Configuration of the Image Forming Device

First, an example of the general configuration of an image forming device 1 will be described.

Figure 1:
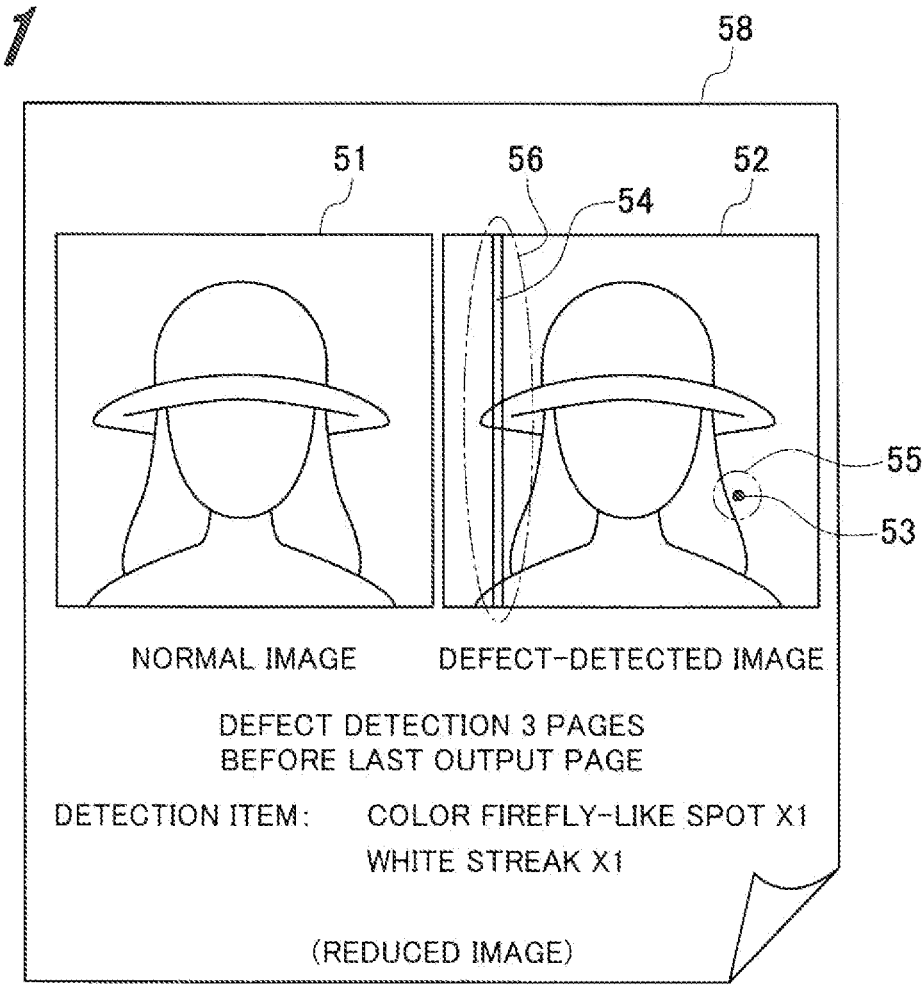
FIG. 1 is an explanatory drawing which shows an example of an existing defect detection report.
Figure 2:
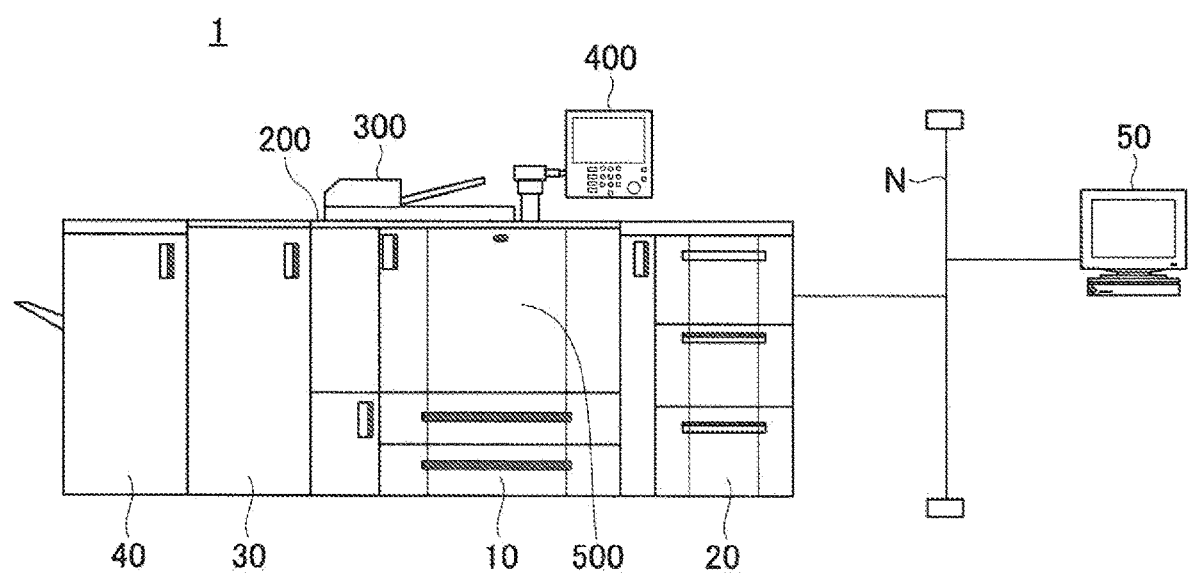
FIG. 2 is a schematic diagram which shows an example of the general configuration of an image forming device according to an embodiment of the present invention.

FIG. 2 is a schematic diagram which shows an example of the general configuration of the image forming device 1. FIG. 2 shows the elements considered as required to explain the present invention or related elements thereto and the image forming device 1 is not limited to the example.

As shown in FIG. 2, the image forming device 1 according to the present embodiment includes a main unit 10, a large capacity paper feeder 20, a reader 30, and an after-treatment section 40. The image forming device 1 is connected to an information terminal 50 via a network N such as LAN.

As shown in FIG. 2, the main unit 10 includes a scanner 200, an ADF (Auto Document Feeder) 300, an operation display 400, and a printer 500. In other words, the image forming device 1 according to the present embodiment is a so-called digital multifunctional machine which has a scanner function, a copying function, and a printer function.

The main unit 10 includes a plurality of paper feed trays with a paper feed mechanism, and a paper feed sensor (not shown) to detect the supplied sheet is provided near each paper feed tray. Each of the paper feed trays can house paper (an example of a recording material), in which the paper type (plain paper, one-side printed paper, recycled paper, wood-free paper, tab paper, etc.) and size can be different among the trays. A resin sheet may be used as a recording material.

The reader 30 is an example of the image inspection device which reads the printed sheet conveyed from the main unit 10 and determines whether the sheet is normal or not. The sheet is inspected according to the read image generated by reading the front and back sides of the conveyed sheet with CCDs (Charged Coupled Devices) 31 installed for each side of the sheet (see FIG. 3 which will be described later).

The after-treatment section 40 is a so-called finisher which performs various after-treatment processes for the sheet inspected by the reader 30. For example, the after-treatment section 40 includes a sorting unit which performs sorting of the sheet conveyed from the main unit 10, a punching unit which performs punching, a folding unit which performs folding, an edge trimming unit which performs edge trimming, and a cutting unit which performs cutting. These units are not shown in the figure.

The after-treatment section 40 also includes paper delivery trays. The sheet conveyed through the reader 30 is delivered to a paper delivery tray. If the reader 30 detects an abnormality in a printed sheet, the after-treatment section 40 performs control to deliver the sheet in a manner to distinguish it from a normal printed sheet. Therefore, the after-treatment section 40 includes not only a normal paper delivery tray for normal sheets but also an abnormal paper delivery tray for sheets detected as abnormal.

In the image forming device 1, for example, the original placed on the original tray of the ADF 300 is conveyed to the contact glass as the reading area for the scanner 200 and the image of the original is read by the optical system of the scanner 200. Here, the image is not limited to image data such as a graphic or photo but also includes text data such as characters and symbols.

The image (analog image signal) read by the scanner 200 is sent to a management section 100 shown in FIG. 3 which will be described later and in the management section 100, it is A/D converted and subjected to various image processing steps before being sent to the printer 500 in the main unit 10. The printer 500 forms an image on a sheet supplied from a paper feed tray or the large capacity paper feeder 20 according to the digital image data. The sheet on which the image has been formed is passed through the reader 30 by a paper delivery mechanism and then conveyed to the after-treatment section 40, and in the after-treatment section 40, the sheet is subjected to a prescribed after-treatment and then delivered to the paper delivery tray.

Furthermore, the image forming device 1 is connected to the external information terminal 50 via the network N. Various data including printing instructions are sent from the information terminal 50 to the image forming device 1. Then, the image forming device 1 performs the printing process to form an image on a sheet according to an instruction from the information terminal 50.

The operation display 400 shows a message indicating an abnormality on a printed sheet according to the result of inspection of a read image by the reader 30, or an abnormal image, etc. Such a message or image may be transmitted via the network N to the information terminal 50 and displayed on the information terminal 50. The operation display 400 is used as an example of an inspection result report output section 127 in FIG. 4 which will be described later.

Example of the Configuration of the Main Part of the Image Forming Device

Next, an example of the configuration of the main part of the image forming device 1 will be described.

Figure 3:
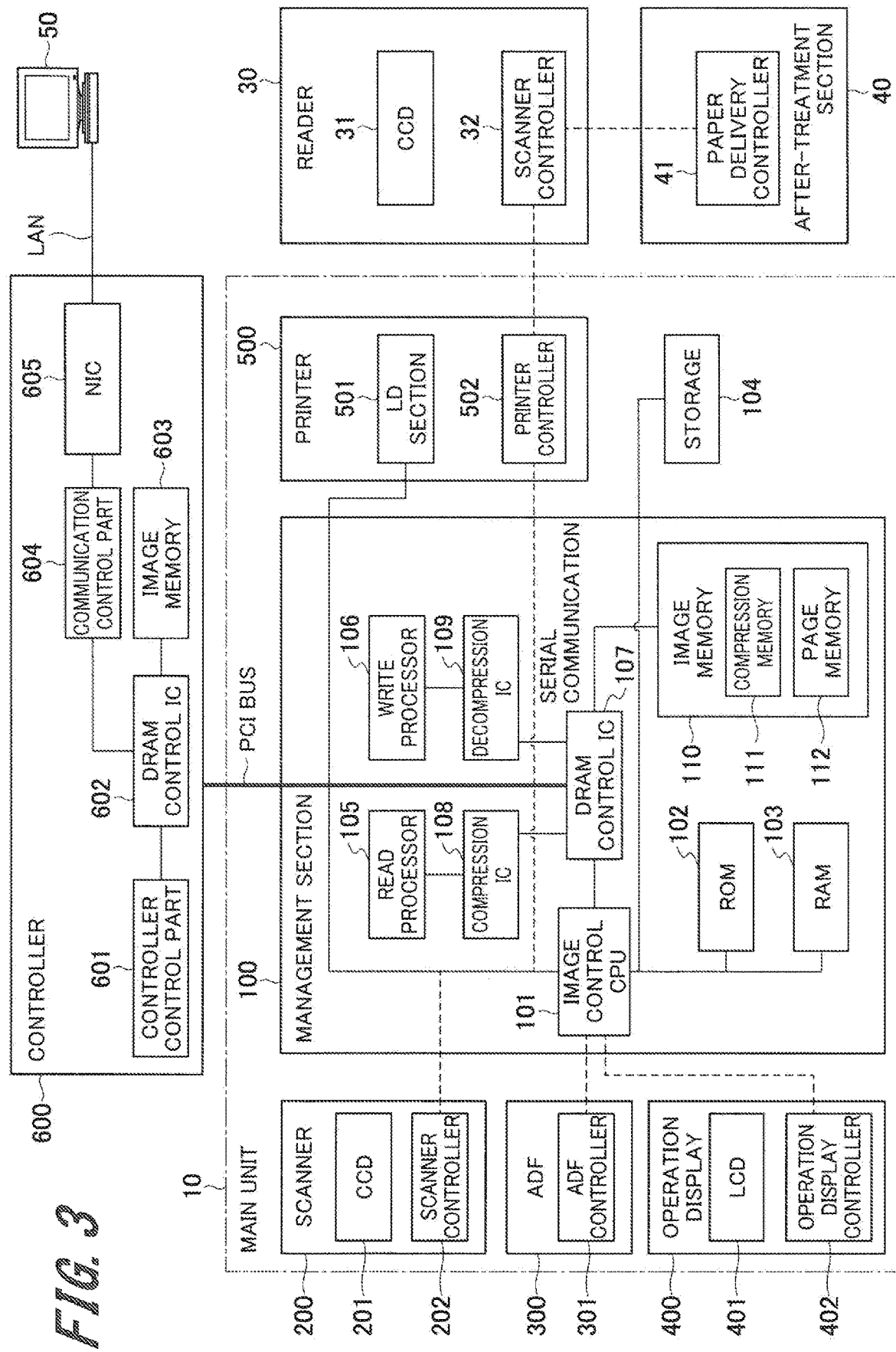
FIG. 3 is a control block diagram which shows an example of the configuration of the main part of the image forming device according to the embodiment of the present invention.

FIG. 3 is a control block diagram which shows an example of the configuration of the main part of the image forming device 1.

The main unit 10 includes the management section 100, scanner 200, ADF 300, operation display 400, printer 500, and a controller 600.

The management section 100 includes an image control CPU (Central Processing Unit) 101, a ROM (Read Only Memory) 102, a RAM (Random Access Memory) 103, a read processor 105, a write processor 106, a DRAM (Dynamic Random Access Memory) control IC 107, a compression IC 108, a decompression IC 109, and an image memory 110. The management section 100 is connected to a storage 104.

The image control CPU 101 reads the various processing programs stored in the ROM 102, such as a system program, an image forming program, and a paper delivery processing program, and decompresses the programs in the RAM 103 and centrally controls the operation of the components of the image forming device 1 according to the decompressed program.

For example, the image control CPU 101 generates a job according to the image information received from the scanner 200 connected to the management section 100, or the controller 600, and the setup information received through the operation display 400 connected to the management section 100. Then, an image is formed on a sheet of paper by executing the job. Here, the job means a series of operating steps related to the formation of an image. For example, when originals for a certain number of pages (sheets) are to be duplicated, the entire series of operating steps to form images from the originals for the certain number of pages constitutes one job.

The ROM 102 is a nonvolatile memory as an example of a non-transitory computer-readable recording medium, such as a semiconductor memory, which stores various processing programs including the system program for the image forming device 1, an image forming program executable on the system program, and a paper delivery processing program. These programs are stored in the form of a computer-readable program code which is used in the image forming device 1, and the image control CPU 101 sequentially performs operation according to the program code.

The RAM 103 serves as a work area which temporarily stores the various programs to be executed by the image control CPU 101 and data related to the programs, and stores a job queue, various operation settings and so on.

The storage 104 is a nonvolatile memory or the like, which stores various setting data related to the image forming device 1. The storage 104 also stores image information related to execution of a job.

The read processor 105 performs various processes such as analog signal processing, A/D conversion, and shading, on the analog image signal received from the scanner 200, generates digital image data and sends it to the compression IC 108.

The write processor 106 generates a PWM (Pulse Width Modulation) signal according to the image data received from the decompression IC 109 and sends it to the printer 500.

The DRAM control IC 107 controls the compression process of image data by the compression IC 108 and the decompression process of compressed data by the decompression IC 109 under the control by the image control CPU 101 and also controls input/output of image data in the image memory 110. For example, when an instruction is issued to store the image data read by the scanner 200, the DRAM control IC 107 causes the compression IC 108 to compress the image data received from the read processor 105 and store the compressed image data in the compression memory 111 of the image memory 110.

Furthermore, when an instruction is issued to form an image from the compressed image data stored in the compression memory 111, the DRAM control IC 107 reads the compressed image data from the compression memory 111 and causes the decompression IC 109 to decompress it and store the decompressed data in the page memory 112. Further, the DRAM control IC 107 reads the image data stored in the page memory 112 and sends it to the write processor 106.

The compression IC 108 compresses the received image data under the control by the DRAM control IC 107.

The decompression IC 109 decompresses the received compressed image data under the control by the DRAM control IC 107.

The image memory 110 is, for example, a DRAM as a volatile memory and includes a compression memory 111 and a page memory 112. The compression memory 111 is a memory to store compressed image data and the page memory 112 is a memory to temporarily store the non-compressed image data for image formation before forming an image.

The scanner 200 includes an image sensor such as a CCD 201, and a scanner controller 202. The scanner controller 202 controls the various parts of the scanner 200 according to a control signal from the image control CPU 101. Specifically, it performs control so that the surface of the original placed on the contact glass is exposure-scanned, reflected light is made to form an image in the CCD 201 and the image is read. Then, the optical signal for the image is photoelectrically converted into an analog image signal which is sent to the read processor 105.

The ADF 300, which includes an ADF controller 301 which controls the ADF 300 according to a control signal from the image control CPU 101, automatically supplies the originals placed on an original tray (not shown) onto the contact glass of the scanner 200 sheet by sheet.

The operation display 400 includes an LCD (Liquid Crystal Display) 401, an operation display controller 402, and a group of control keys and a touch panel which are not shown in the figure.

The LCD 401 displays, on its surface, various setup screens, image states, operating conditions of various functions and so on according to a display control signal from the operation display controller 402. The surface of the LCD 401 is a pressure-sensitive (resistance film pressure type) touch panel in which transparent electrodes are arranged in a grid pattern, so that the XY coordinates of a point to which a force has been applied with a finger, touch pen or the like are detected as voltage values and the detected position signal is sent as an operation signal to the operation display controller 402.

The operation display controller 402 controls the display on the LCD 401 according to a control signal from the image control CPU 101. For example, it causes the LCD 401 to display various setup screens for the paper used in the image forming process and various processing results. Also, the operation display controller 402 sends the operation signal entered with the touch panel or control keys of the LCD 401 to the image control CPU 101.

On the LCD 401 of the operation display 400, the user can view the basic screen for entry of printing conditions for the image forming process and a list of jobs reserved in the image forming device 1. The user can alter various settings for the image forming process as desired by operating the touch panel, etc. of the LCD 401.

The printer 500 includes an LD (Laser Diode) section 501 and a printer controller 502 and forms an image on a sheet of paper according to the image data received from the write processor 106.

The LD section 501 includes an LD, a photoreceptor drum, an electrifying part, an exposure part, a development part, a transfer part, a cleaner, and a fixing part. The LD section 501 also includes various rollers such as paper feed rollers, resist rollers, and paper delivery rollers for conveying the sheet along the conveying path in the LD section 501, a conveying path switching plate, and an inversion section. The conveyor of the LD section 501 supplies the sheet specified by the job from a paper feed tray under the control by the printer controller 502 and conveys the supplied sheet on the conveying path.

A plurality of sensors are provided on the conveying path of the LD section 501. These sensors generate a detection signal as the sheet passes and send it to the printer controller 502.

The printer controller 502 receives a control signal from the image control CPU 101 and controls operation of various parts of the LD section 501. The printer controller 502 counts the number of sheets supplied for each job according to detection signals from the sensors located on the conveying path and sends it to the image control CPU 101.

In the printer 500, according to an instruction from the printer controller 502, the photoreceptor drum surface is electrified by the electrifying part and according to a PWM signal received from the write processor 106, the photoreceptor drum surface is irradiated with laser light from the LD to form an electrostatic latent image. Then, in the development part, toner is made to adhere to the area of the photoreceptor drum surface including the electrostatic latent image and the toner is transferred to the sheet by the transfer part to form an image. After the transferred image is fixed by the fixing part, the sheet on which the image has been formed is conveyed by the paper delivery rollers to the reader 30 and the after-treatment section 40.

The controller 600 includes a controller control part 601, a DRAM control IC 602, an image memory 603, a communication control part 604, and an NIC (Network Interface Card) 605.

The controller control part 601 centrally controls operation of various parts and distributes the data received from the external information terminal 50 as a job through the communication control part 604 and NIC 605 to the management section 100.

The DRAM control IC 602 controls storage of data received by the NIC 605 and communication control part 604 in the image memory 603 and reading of data from the image memory 603. Also, the DRAM control IC 602 is connected to the DRAM control IC 107 of the management section 100 via a PCI (Peripheral Components Interconnect) bus so that data for image formation is read from the image memory 603 and sent to the DRAM control IC 107 according to an instruction from the controller control part 601.

The image memory 603 is a DRAM which temporarily stores the received data.

The communication control part 604 controls communication of the NIC 605. The NIC 605 is a communication interface for connection to the network N and receives image information, a job or the like from the information terminal 50 via the network N and sends it to the DRAM control IC 602.

The reader 30 includes an image sensor such as a CCD 31 and a scanner controller 32. The scanner controller 32 controls various parts of the reader 30 according to a control signal received from the image control CPU 101 through the printer controller 502. Specifically, the front and back sides of the sheet conveyed from the main unit 10 are scanned, reflected light from the sheet is made to form an image in the CCD 31 and the image formed on the sheet is read. Then, the scanner controller 32 generates image data according to an optical signal from the CCD 31 and sends the image data to the image control CPU 101 through the printer controller 502.

The after-treatment section 40 includes a paper delivery controller 41. The after-treatment section 40 performs various after-treatment processes and then delivers the sheet inspected by the reader 30 to a paper delivery tray. The paper delivery controller 41 controls paper delivery according to the result of inspection by the scanner controller 32 of the reader 30. Thus, the user can get a pile of sheets of paper in the paper delivery tray.

Example of the Internal Configuration of the Image Forming Device

Next, an example of the internal configuration of the image forming device 1 will be described.

Figure 4:
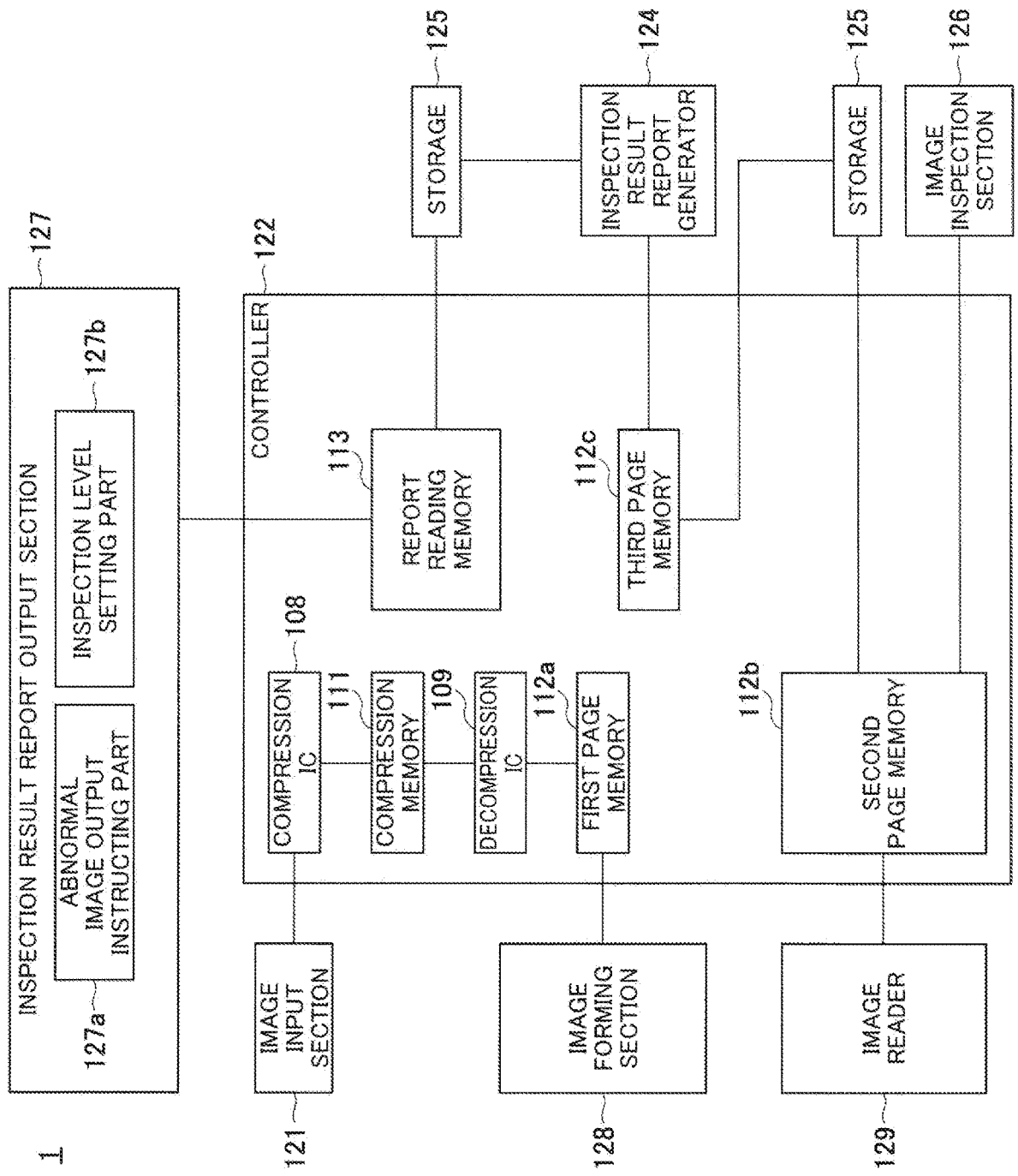
FIG. 4 is a functional block diagram which shows an example of the internal configuration of the image forming device according to the embodiment of the present invention.

FIG. 4 is a functional block diagram which shows an example of the internal configuration of the image forming device 1.

The image forming device 1 includes an image input section 121, a controller 122, an inspection result report generator 124, a storage 125, an image inspection section 126, the inspection result report output section 127, an image forming section 128, and an image reader 129. The functions of these components are outlined below, referring to FIG. 4.

The image input section 121 transfers the image received from the controller 600 shown in FIG. 3 to the controller 122. Also, the image input section 121 receives an instruction to switch to the production printing mode or proof mode or an instruction to inspect an image or the like from the controller 600 or the information terminal 50. In the production printing mode, production printing is performed in which the image forming device 1 prints an image on a sheet of paper according to the original image. In the production printing mode, the read image from each printed sheet is checked for a stain, scratch or the like.

On the other hand, in the proof mode, processing is performed so that the read image generated by reading the sheet first printed by the image forming device 1 subjected to calibration setup alteration, etc. is used as a proofing image (hereinafter called "reference image"). The time to generate a reference image in the proof mode is, for example, before production printing is started. Generally, the image printed on a sheet by the image forming device 1 in the proof mode is visually checked by the user to determine whether it is normal or not, and if it is normal, the read image from that sheet is used as a reference image. After that, a read image is inspected by comparison with the reference image.

Alternatively, the image obtained by processing the original image by a RIP (Raster Image Processor) may be used as a reference image.

The controller 122 performs various control tasks which include issuance of an image input instruction, an image formation instruction, and an image inspection instruction, control of recovery printing, and issuance of an instruction to store an image or page information in the storage 125, an instruction to generate an inspection result report, and an instruction to output an inspection result report. When the controller 122 controls recovery printing, it issues an instruction to perform recovery printing not only for the page of the read image determined as abnormal by the image inspection section 126, but also for the subsequent pages of the images formed after that page or the pages under conveyance.

The inspection result report generator 124 generates an inspection result report according to the read image generated by the image reader 129 reading a sheet, and the page information of the job. The page information of the job will be described later referring to FIG. 7.

The storage 125 stores a read image, page information of a job, an inspection result report and so on.

The image inspection section 126 inspects a read image according to an instruction from the controller 122. The image inspection section 126 outputs an inspection result which takes an image determined not to have an abnormality as a normal image and a read image determined to have an abnormality as an abnormal image. A normal image is, for example, a read image which does not contain an abnormality such as a stain. An abnormal image is, for example, a read image which contains an abnormality such as a stain.

The inspection result report output section 127 displays the inspection result report generated by the inspection result report generator 124 on the operation display 400. The operation display 400 includes hardware keys provided as physical devices and a touch panel display. The touch panel display shows software keys (operation object images) as keys reproduced by software. The user can control the image forming device 1 in various ways by touching the hardware keys or software keys of the operation display 400. An inspection result report appears on the touch panel display (screen) of the operation display 400. The inspection result report will be described in detail later, referring to FIG. 8 and subsequent figures.

The inspection result report output section 127 may instruct the image forming section 128 to print an inspection result report. If that is the case, the inspection result report is printed on paper.

The inspection result report output section 127 includes an abnormal image output instructing part 127a to issue an instruction to display an abnormal image and an inspection level setting part 127b to set an inspection level. The abnormal image output instructing part 127a and the inspection level setting part 127b operate according to input from operation object images which appear on the same screen as the inspection result report and accept an instruction from the user.

The abnormal image output instructing part 127a has the function to instruct the controller 122 to display an abnormal image. The abnormal image output instructing part 127a is activated by touching (pressing) the ABNORMAL IMAGE button 404 or ABNORMAL IMAGE COMPARISON button 403 shown in FIG. 9 which will be described later. For example, when the ABNORMAL IMAGE button 404 is pressed, only an abnormal image appears in the inspection result report and when the ABNORMAL IMAGE COM- PARISON button 403 is pressed, a normal image and an abnormal image appear side by side in the inspection result report.

The inspection level setting part 127b adjusts the inspection level (inspection severity) at which the image inspection section 126 inspects a read image. The inspection level setting part 127b is activated, for example, by touching (pressing) the ADJUST button 415 shown in FIGS. 10 to 12 which will be described later. When the ADJUST button 415 is pressed, the screen showing an inspection result report is changed to a screen on which the inspection level can be set. On the changed screen, level buttons to enable setting of an inspection level appear as operation object images which accept an instruction operation. The inspection level setting can be altered by the user touching one of the operation object images.

The image forming section 128 forms an image on a sheet of paper according to an instruction from the controller 122 and outputs the sheet on which the image has been formed.

The image reader 129 reads the sheet sent from the image forming section 128 and outputs the generated read image. The read image is stored, for example, in the storage 125.

The function of the image input section 121 is implemented, for example, by the DRAM control IC 107 of the management section 100 shown in FIG. 3. The functions of the controller 122, inspection result report generator 124, storage 125, image inspection section 126, and inspection result report output section 127 are implemented, for example, by the image control CPU 101 of the management section 100. The function of the image forming section 128 is implemented, for example, by the printer 500. The function of the image reader 129 is implemented, for example, by the reader 30.

Example of Operation of the Components of the Image Forming Device

Figure 5:
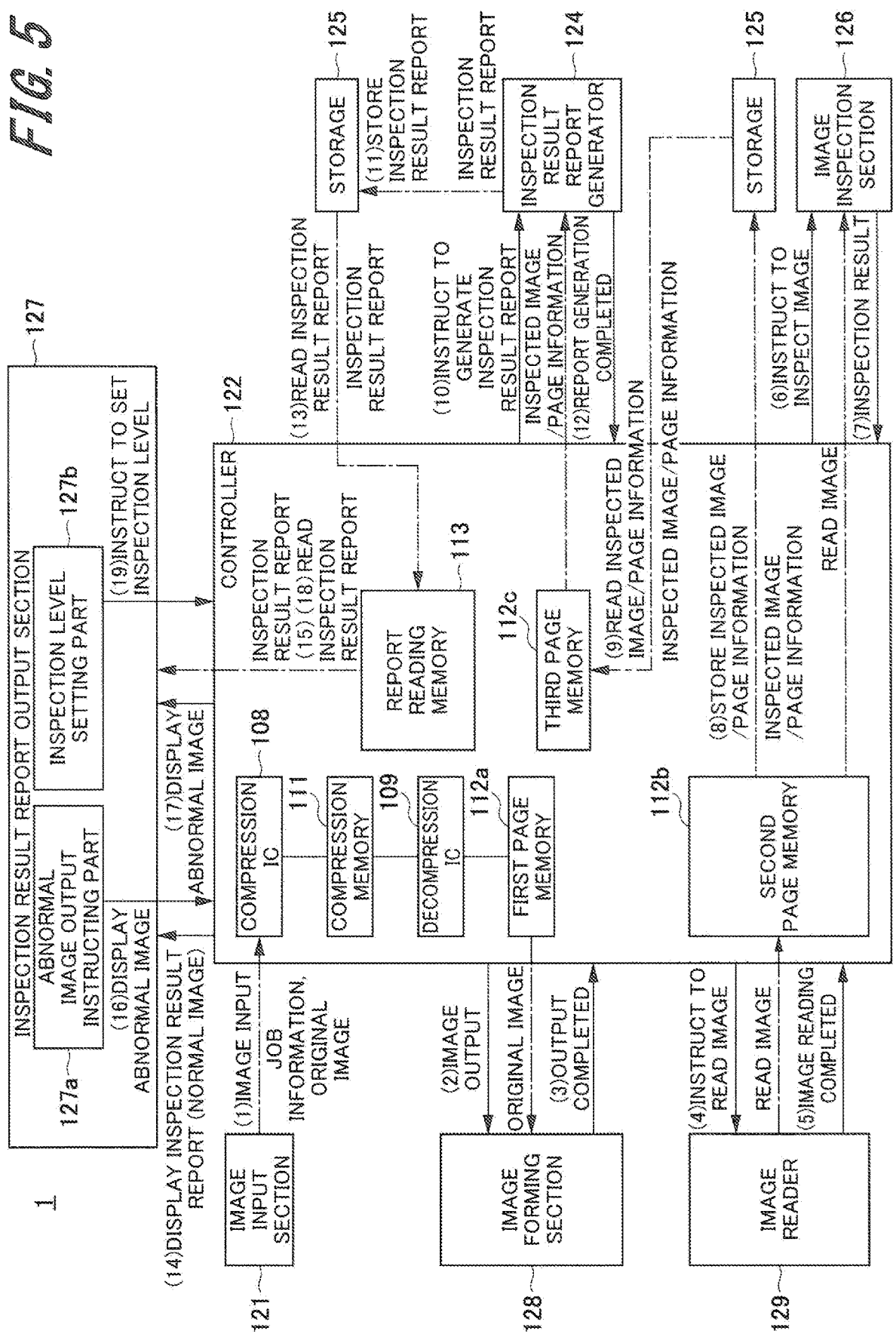
FIG. 5 is a functional block diagram which shows an example of various components of the image forming device according to the embodiment of the present invention.

FIG. 5 is a functional block diagram which shows an example of various components of the image forming device 1. The functional blocks shown in FIG. 5 are the same as the functional blocks shown in FIG. 4. FIG. 5 illustrates how each functional block is linked to other functional blocks in relation to the processing steps (1) to (19) indicated in the figure.

(1) First, an image is entered from the image input section 121 into the controller 122. The image here includes job information and a job as an original image. The image has been received from the controller 600 by the image input section 121. Then, the controller 122 starts the job. As the job is started, the controller 122 compresses the image received from the image input section 121 using the compression IC 108 and stores it in the compression memory 111. Then, the controller 122 decompresses the compressed image stored in the compression memory 111 using the decompression IC 109 and stores the decompressed image in a first page memory 112a.

(2) Next, the controller 122 instructs the image forming section 128 to form an image. At this time, the image forming section 128 reads the original image from the first page memory 112a. Upon reception of the instruction from the controller 122, the image forming section 128 performs the printing process to form an image on a sheet. The sheet with the image formed is conveyed from the main unit 10 to the reader 30.

(3) After output of the sheet is completed, the image forming section 128 notifies the controller 122 of completion of output of the sheet with the image formed.

(4) Next, the controller 122 instructs the image reader 129 to read the image.

(5) The image reader 129 reads the image formed on the sheet conveyed from the main unit 10 and stores the read image in a second page memory 112b. Then, the image reader 129 notifies the controller 122 of completion of reading.

(6) Next, the controller 122 instructs the image inspection section 126 to inspect the image. At this time, the image inspection section 126 reads the read image from the second page memory 112b.

(7) The image inspection section 126 inspects each sheet to check whether the read image read from the second page memory 112b has an abnormality such as a stain or not. If the image inspection section 126 determines that the read image has an abnormality, it notifies the controller 122 of the inspection result including information on where the abnormality has been detected. If the image inspection section 126 determines that the read image does not have an abnormality, it notifies the controller 122 of the inspection result that no abnormality has been detected. Notified of the inspection result, the controller 122 calculates the number of pages which require recovery printing, according to the sheet on which the abnormality has been detected.

(8) Next, the controller 122 stores the read image inspected by the image inspection section 126, in the storage 125 along with the page information of the job.

(9) The controller 122 reads the read image inspected by the image inspection section 126 and the page information of the job from the storage 125 and writes them in a third page memory 112c.

(10) The controller 122 instructs the inspection result report generator 124 to generate an inspection result report. The inspection result report generator 124 generates inspection result reports for all the pages included in the job. At this time, the inspection result report generator 124 reads the read image inspected by the image inspection section 126 and the page information from the third page memory 112c.

(11) The inspection result report generator 124 stores the inspection result report in the storage 125.

(12) The inspection result report generator 124 notifies the controller 122 of completion of generation of the inspection result report.

(13) The controller 122 writes the inspection result report read from the storage 125 in a report reading memory 113.

(14) The controller 122 instructs the inspection result report output section 127 to display the inspection result report including the normal image.

(15) The inspection result report output section 127 reads the inspection result report stored in the report reading memory 113 and displays the normal image.

Next, the case that the abnormal image output instructing part 127a issues an instruction to display an abnormal image will be described. The instruction is issued from the abnormal image output instructing part 127a by the user touching (pressing) an operation object image on the inspection result report output section 127. The following two buttons are available as operation object images: the ABNORMAL IMAGE COMPARISON button 403 and the ABNORMAL IMAGE button 404 which will be described later, referring to FIG. 9.

(16) The abnormal image output instructing part 127*a* instructs the controller 122 to display an abnormal image.

(17) When the ABNORMAL IMAGE COMPARISON button 403 of the abnormal image output instructing part 127*a* is pressed, the controller 122 issues an instruction to display a normal image and a corresponding abnormal image. When the ABNORMAL IMAGE button 404 of the abnormal image output instructing part 127*a* is pressed, the controller 122 instructs the inspection result report output section 127 to display the abnormal image.

(18) The inspection result report output section 127 reads the inspection result report stored in the report reading memory 113 and displays only the abnormal image or both the normal image and abnormal image side by side according to the instruction.

Next, adjustment of the inspection level of the image inspection section 126 will be described.

(19) The inspection level setting part 127*b* instructs the controller 122 to switch to the inspection level setting screen. The instruction is issued from the inspection level setting part 127*b* by the user touching (pressing) an operation object image on the inspection result report output section 127. The operation object images which represent the level buttons are shown in FIG. 13 which will be described later. The controller 122 causes the inspection level setting screen to appear (described later referring to FIG. 13).

Next, recovery printing as instructed by the controller 122 will be described.

If a read image is determined as abnormal, the controller 122 issues an instruction to perform recovery printing of the page having the image corresponding to the read image. Therefore, the controller 122 notifies the controller 600 of information on the read image for recovery printing and instructs the image forming section 128 to perform recovery printing. The image forming section 128 performs recovery printing according to the information on the read image for recovery printing as calculated by the controller 122. The sheets on which recovery printing has been made are also read by the image reader 129 and inspected by the image inspection section 126 and an inspection result report is generated and outputted as necessary.

Example of Image Inspection by the Image Inspection Section

Figure 6:
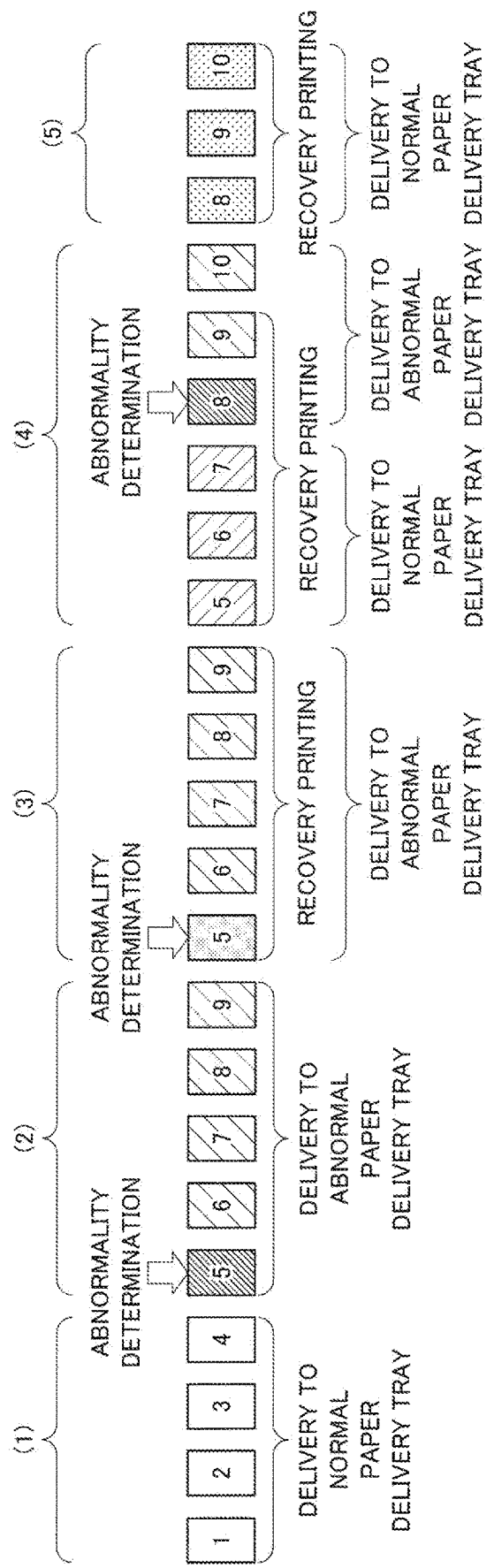
FIG. 6 is an explanatory drawing which shows an example of image inspection which is made by the image inspection section according to the embodiment of the present invention.

FIG. 6 is an explanatory drawing which shows an example of image inspection which is made by the image inspection section 126.

Here, an example that ten page images are formed on sheets will be explained. In FIG. 6, the arrows indicate that the image inspection section 126 detects a read image as abnormal. The page of a read image determined as abnormal by the image inspection section 126 is marked with the wording "ABNORMALITY DETERMINATION".

Each rectangular frame in FIG. 6 represents a sheet on which an image has been formed by the image forming section 128 or a sheet being conveyed through the conveying path in the image forming device 1 before image formation. The number in each frame represents which page image has been formed or is to be formed.

This example assumes that ten pages of images are formed on sheets. In the explanation below, the read image of the first page is called "read image 1". Similarly, the read images of the second to tenth pages are called "read image 2" to "read image 10".

(1) First, it is assumed that read images 1 to 4 are determined by the image inspection section 126 not to have an abnormality. Therefore, the sheets on which the first to fourth page images have been formed are delivered to the usual paper delivery tray (normal paper delivery tray). In the explanation below, when the image inspection section 126 inspects a read image and determines it not to have an abnormality, the determination is called "normality determination".

(2) It is assumed that after the four sheets for the first to fourth pages are delivered to the normal paper delivery tray, the read image 5 of the fifth page is determined to have an abnormality by the image inspection section 126. In the explanation below, when the image inspection section 126 inspects a read image and determines it to have an abnormality, the determination is called "abnormality determination". When the read image 5 of the fifth page is determined as abnormal, the sheets for the sixth to ninth pages after the fifth page determined as abnormal already have images or have been conveyed to the conveying path in the image forming device 1. If the read images of the sixth to ninth pages are determined as normal, in the ordinary course of events the sheets having the images of the sixth to ninth pages will be delivered to the normal paper delivery tray. After that, if recovery printing of the fifth page image is performed and the read image 5 of the fifth page is determined as normal, the sheet having the fifth page image will be delivered after the sheets having the sixth to ninth page images which have already been delivered to the normal paper delivery tray. If so, the sheets will not be piled in page numerical order. On the other hand, in the present embodiment, for the above reason, the sheets already having the sixth to ninth page images or the sheets being conveyed through the conveying path in the image forming device 1 for the sixth to ninth page images are treated as spoilage. Therefore, the sheets having the sixth to ninth page images are delivered to the abnormal paper delivery tray along with the sheet having the fifth page image determined as abnormal.

(3) Next, the image forming device 1 starts recovery printing of the fifth and subsequent page images according to an instruction from the controller 122. In FIG. 6, it is assumed that the read image 5 is again determined as abnormal by the image inspection section 126. In this case, the sheets having the sixth to ninth page images formed by recovery printing are delivered to the abnormal paper delivery tray along with the sheet having the fifth page image determined as abnormal.

(4) Next, the image forming device 1 again starts recovery printing of the fifth page image according to the instruction from the controller 122. Then, it is assumed that the image inspection section 126 determines the read image 8 as abnormal. In this case, the sheets having the fifth to seventh page images determined as normal are delivered to the normal paper delivery tray and the sheet having the eighth page image determined as abnormal and the sheets already having the ninth and tenth page images or the sheets being conveyed through the conveying path in the image forming device 1 for the ninth and tenth page images are delivered to the abnormal paper delivery tray.

(5) Next, the image forming device 1 starts recovery printing of the eighth and subsequent page images according to an instruction from the controller 122. Then, the image inspection section 126 determines the read images 8 to 10 as normal. The sheets having the eighth to tenth page images determined as normal are delivered to the normal paper delivery tray. The job for the ten pages is thus finished.

In the present embodiment, in the job, after recovery printing of an image corresponding to a read image determined as abnormal by the image inspection section 126 is performed, a read image which is generated by the image reader 129 and determined as normal by the image inspection section 126 is called a normal image. Also, in executing the same job as the job executed in the past, if an image formed on a sheet is read by the image reader 129 and the read image is determined as normal by the image inspection section 126, the read image is also called a normal image.

Figure 7:
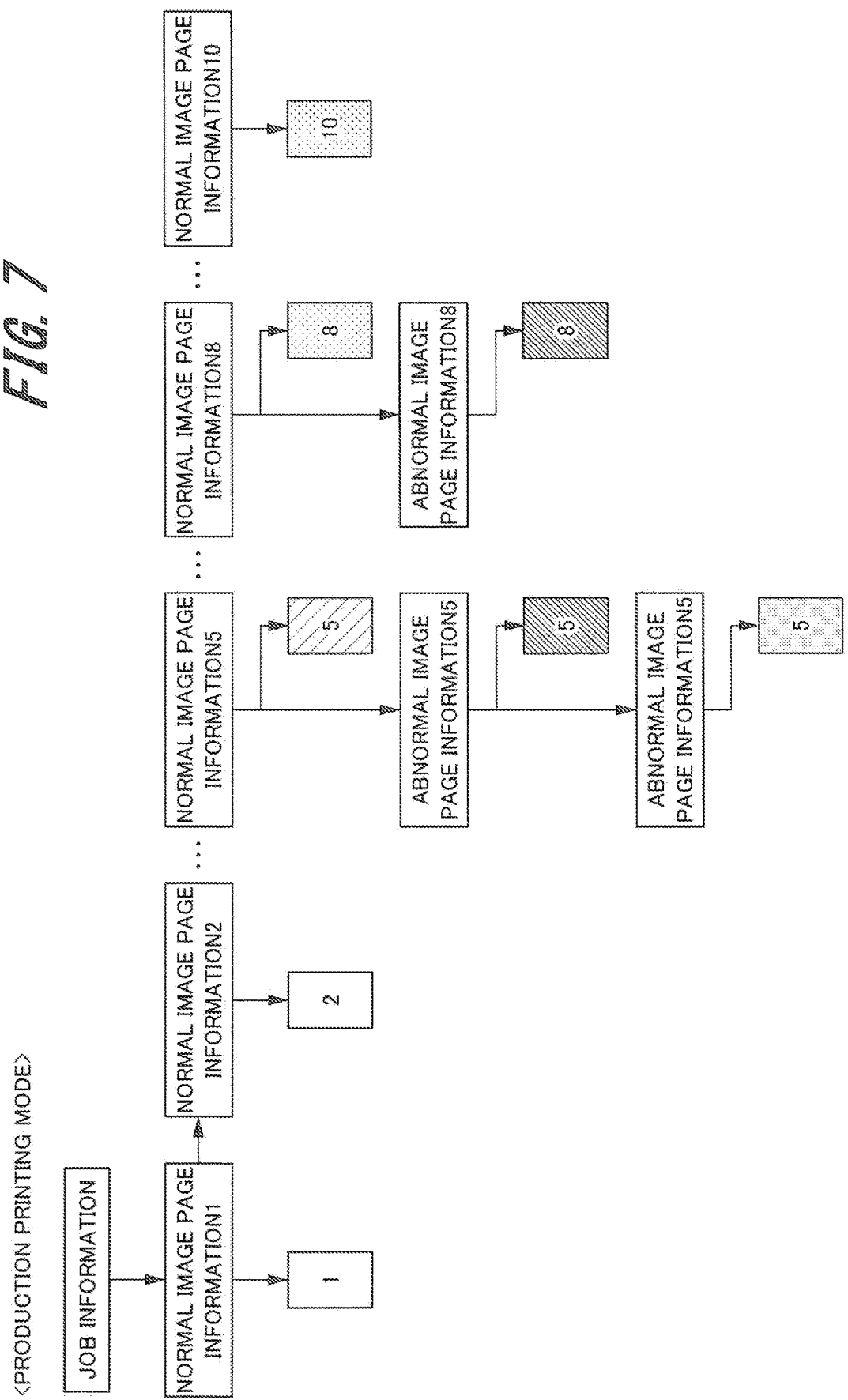
FIG. 7 is an explanatory drawing which shows an example of storage of the inspection results of read images by the image inspection section according to the embodiment of the present invention.

Example of Storage of the Inspection Results of Read Images by the Image Inspection Section FIG. 7 is an explanatory drawing which shows an example of storage of the inspection results of read images by the image inspection section 126. The figure illustrates how the inspection results of the read images 1 to 10 (FIG. 6) inspected by the image inspection section 126 are stored in the storage 125.

For example, the result of inspection by the image inspection section 126 contains job information and page information of each page. For example, the page information of each page contains a read image generated by the image reader 129 reading a sheet. The page information includes normal image page information concerning a normal image and abnormal image page information concerning an abnormal image.

The job information at least holds the page information address of the read image 1 determined as normal by the image inspection section 126. The page information of the read image 1 determined as normal is called normal image page information 1. Similarly, the page information of the read images 2 to 10 determined as normal is called normal image page information 2 to 10.

Each piece of normal image page information (for example, normal image page information 1) at least holds the address of each read image (for example, read image 1) in the storage 125 which stores it. Furthermore, each piece of normal image page information (for example, normal image page information 1) holds the address of the page information of the next page read image determined as normal (for example, normal image page information 2).

The normal image page information of a page including a normal image and an abnormal image holds the address of abnormal image page information of the read image determined as abnormal by the image inspection section 126. For example, page information of read image 1 determined as abnormal is called abnormal image page information 1. Similarly, page information of read images 2 to 10 determined as abnormal is called abnormal image page information 2 to 10. FIG. 7 illustrates that two pieces of abnormal image page information 5 are stored in page 5, and one piece of abnormal image page information 8 is stored in page 8.

Each piece of abnormal image page information (for example, abnormal image page information 5) holds the address of each read image (for example, read image 5) in the storage 125. Furthermore, each piece of abnormal image page information (for example, abnormal image page information 5) also holds the address of the page information of the read image determined as abnormal as a result of recovery printing.

Each piece of abnormal image page information at least holds information on the number of detected abnormalities, type of abnormality, and the coordinates of abnormal spots. The coordinates of an abnormal spot are expressed by the coordinates of the left upper and right lower corners of a rectangular frame which surrounds the abnormal spot. Alternatively, the coordinates of the center of the rectangular frame may be taken as the coordinates of the abnormal spot.

If the read image of a page was determined as abnormal before being determined as normal, the controller 122 links the abnormal image page information after the normal image page information and stores the normal image page information and abnormal image page information in the storage 125.

Example of the Composition of an Inspection Result Report

Figure 8:
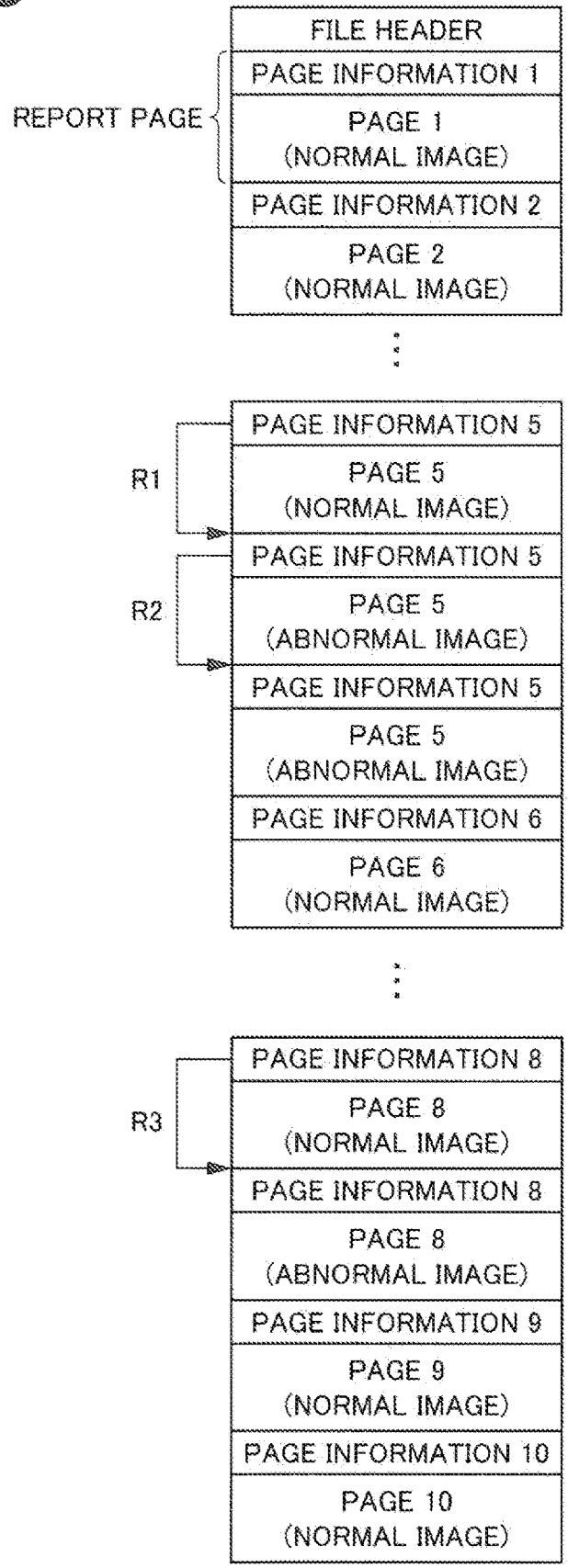
FIG. 8 is an explanatory drawing which shows an example of the composition of an inspection result report according to the embodiment of the present invention.

FIG. 8 is an explanatory drawing which shows an example of the composition of an inspection result report.

The inspection result report is a data file which is stored in the storage 125 for each executed job according to the job information shown in FIG. 7. In this specification, an inspection result report as a data file which is stored in the storage 125 and an inspection result report which is displayed on a screen or the like by the inspection result report output section 127 are explained.

The inspection result report which is stored in the storage 125 contains a read image and the number of detected abnormalities, type of abnormality, the coordinates of abnormal spots and so on which are stored as page information. The inspection result report generator 124 generates an inspection result report according to an instruction from the controller 122 and stores the inspection result report in the storage 125.

The inspection result report, in which the normal image page information of the first to tenth pages, two pieces of abnormal image page information of the fifth page, and one piece of abnormal image page information of the eighth page as shown in FIG. 7 are linked, is stored in the storage 125. The inspection result report contains a file header and a report page for each page. The report page for each page includes page information and an image.

The file header at least holds information such as the number of pages of a job (the number of normal image pages) and the total number of pages (the total number of pages including abnormal images).

In the case of the read image 1, normal image page information 1 of the read image 1 determined as normal by the image inspection section 126 is stored in a report page. Similarly, normal image page information 2 to 10 of the read images 2 to 10 determined as normal by the image inspection section 126 are stored in report pages.

The read images 5 and 8 include the read images generated by reading the images formed on the sheets of the pages for which recovery printing has been performed as a result of abnormality determination.

In the case of the read image 5, abnormal image page information 5 of the read image 5 determined as abnormal by the image inspection section 126 is stored in a report page. Similarly, abnormal image page information 8 of the read image 8 determined as abnormal by the image inspection section 126 is stored in a report page.

The normal image of the read image 1 stored in the report page is called Page 1 (normal image). Similarly, the normal images of the read images 2 to 10 stored in the report pages are called Page 2 (normal image) to Page 10 (normal image), respectively.

The abnormal image of the read image 5 stored in the report page is called Page 5 (abnormal image). Similarly, the abnormal image of the read image 8 stored in the report page is called Page 8 (abnormal image).

Each piece of page information for a read image contains normality or abnormality determination, read image size (vertical, horizontal), read image resolution, and read image tone.

Furthermore, if a read image is determined as abnormal, the page information contains abnormal image link information, the number of detected abnormalities, type of abnormality, and the coordinates of an abnormal spot. If the read image of the page expressed by the page information is determined as abnormal, the abnormal image link information is expressed as the address of the abnormal image in the storage 125 which stores it. The address is a relative value calculated with respect to address 0 allocated to the file header at the top of the inspection result report, which represents the logical position of each report page stored in the inspection result report.

For example, if the read image 5 was determined as abnormal before being determined as normal, normal image page information 5 and abnormal image page information 5 are linked so that the report page for the abnormal image is positioned after the report page for the normal image. In the figure, arrow R1 indicates the direction from the normal image page information 5 of the report page containing Page 5 (normal image) to the abnormal image page information 5 of the report page containing Page 5 (abnormal image) as the read image first determined as abnormal. The arrow R1 suggests that an address as abnormal image link information is stored.

Arrow R2 also suggests that an address as abnormal image link information is stored. The arrow R2 indicates the direction from the abnormal image page information 5 of the report page containing Page 5 (abnormal image) as the read image determined as abnormal for the first time to the abnormal image page information 5 of the report page containing Page 5 (abnormal image) as the read image determined as abnormal for the second time.

Similarly, arrow R3 also suggests that an address as abnormal image link information is stored. The arrow R3 indicates the direction from the abnormal image page information 8 of the report page containing Page 8 (normal image) to the abnormal image page information 8 of the report page containing Page 8 (abnormal image) as the read image determined as abnormal for the first time.

Thus, if a read image is determined as normal by the image inspection section 126, the address of a read image which is on the same page as the normal read image and was previously determined as abnormal is contained in the page information. However, if no read image previously determined as abnormal is stored, the page information contains "no image" information.

Display Examples of Inspection Result Reports

Next, display examples of inspection result reports will be described referring to FIGS. 9 to 15.

Figure 9:
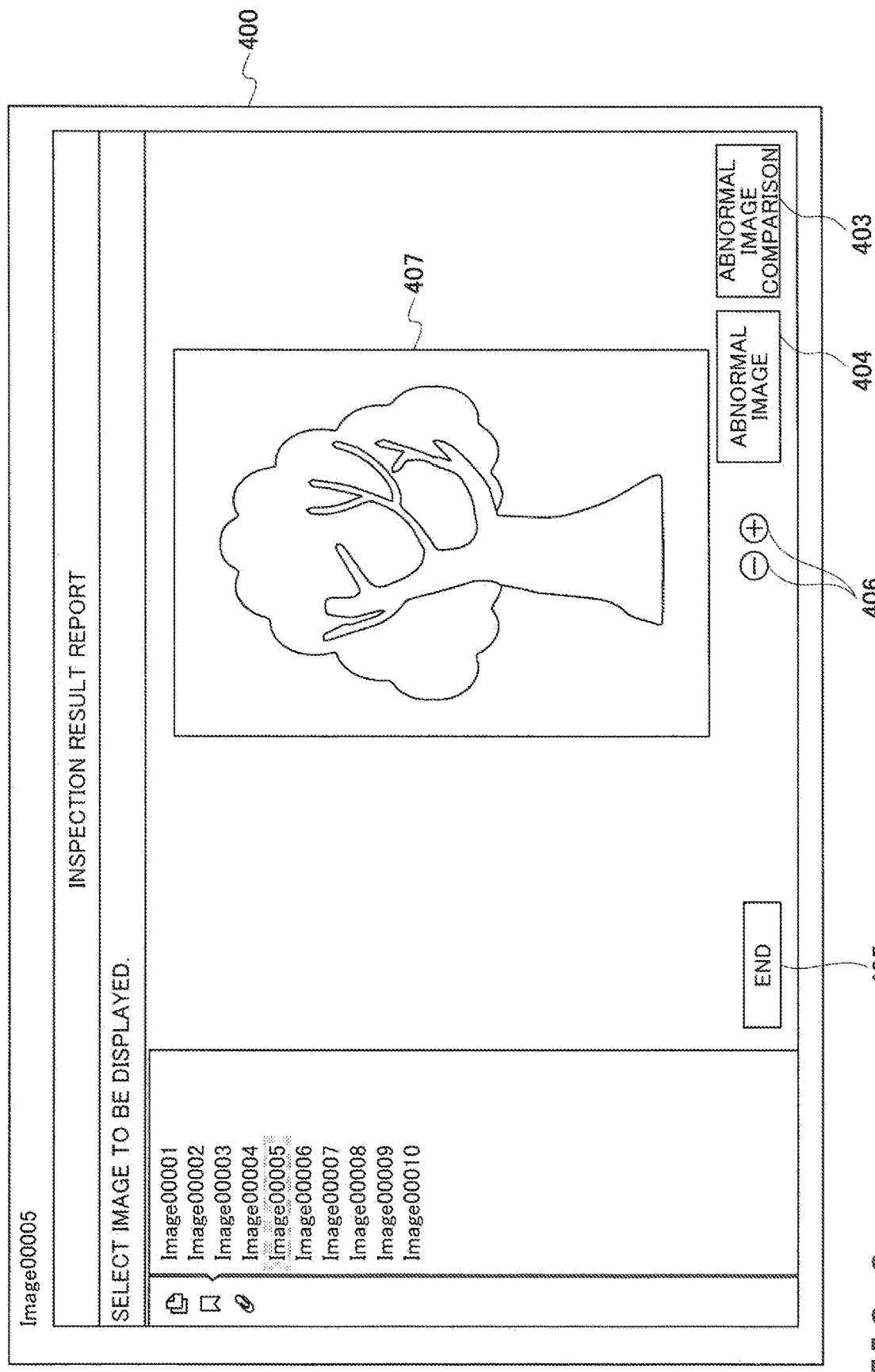
FIG. 9 is an explanatory drawing which shows a display example of an inspection result report according to the embodiment of the present invention.

FIG. 9 is an explanatory drawing which shows a display example of an inspection result report.

FIG. 9 shows an example of an inspection result report generated from the read image 5 detected as abnormal as shown in FIG. 6 which is displayed on the screen of the operation display 400 (inspection result report output section 127). First, an example of a normal image 407 shown in an inspection result report will be explained.

In this inspection result report, "Image00005" is selected and the normal image 407 of the read image 5 corresponding to "Image00005" is displayed. On the left area of the screen of the operation display 400, selector tabs are provided to select a page among the pages of read images 1 to 10 to be displayed in an inspection result report. The selector tabs are marked with the filenames of the inspection result reports "Image00001" to "Image00010" so that the inspection result report for each page can be selected.

In the inspection result report shown in FIG. 9, the normal image 407 of the read image 5 determined as normal is shown. Under the normal image 407, buttons 406 for enlargement and reduction are provided to enable the user to enlarge or reduce the normal image 407. For example, when the "+" button 406 is pressed, the normal image 407 is displayed in enlarged form and when the "−" button 406 is pressed, the normal image 407 is displayed in reduced form. At the bottom of the inspection result report, an END button 405 is provided to enable the user to give an instruction to end the display of the inspection result report. When the user presses the END button 405, the display of the inspection result report is ended.

The abnormal image output instructing part 127a shown in FIG. 4 issues an instruction to the controller 122 to display an abnormal image depending on whether the ABNORMAL IMAGE COMPARISON button 403 or the ABNORMAL IMAGE button 404 at the bottom of the inspection result report is pressed.

The ABNORMAL IMAGE COMPARISON button 403 is used by the user to instruct the inspection result report output section 127 to display a normal image and an abnormal image side by side. When the user presses the ABNORMAL IMAGE COMPARISON button 403, the normal image 407 and abnormal image 408 are displayed side by side in the inspection result report shown in FIG. 9 (see FIG. 11 which will be described later).

The ABNORMAL IMAGE button 404 is used by the user to instruct the inspection result report output section 127 to display an abnormal image. When the user presses the ABNORMAL IMAGE button 404, only the abnormal image 408 is displayed in the inspection result report as shown in FIG. 9 (see FIG. 10 which will be described later).

Although FIG. 9 shows an example of the display on the operation display 400 of the image forming device 1, the display of a report is not limited to the operation display 400 but a report may be displayed on the external PC, tablet terminal or the like connected to the network.

The normal image 407 shown in FIG. 9 is displayed so that the tree is vertically oriented; however, the tree may be horizontally oriented on the display. Therefore, an operation object image which represents a rotation button (not shown) or the like may be added. The horizontally oriented normal image 407 is displayed larger than the vertically oriented normal image 407 so that the normal image 407 can be checked more easily.

Example of an Inspection Result Report Displaying an Abnormal Image

Figure 10:
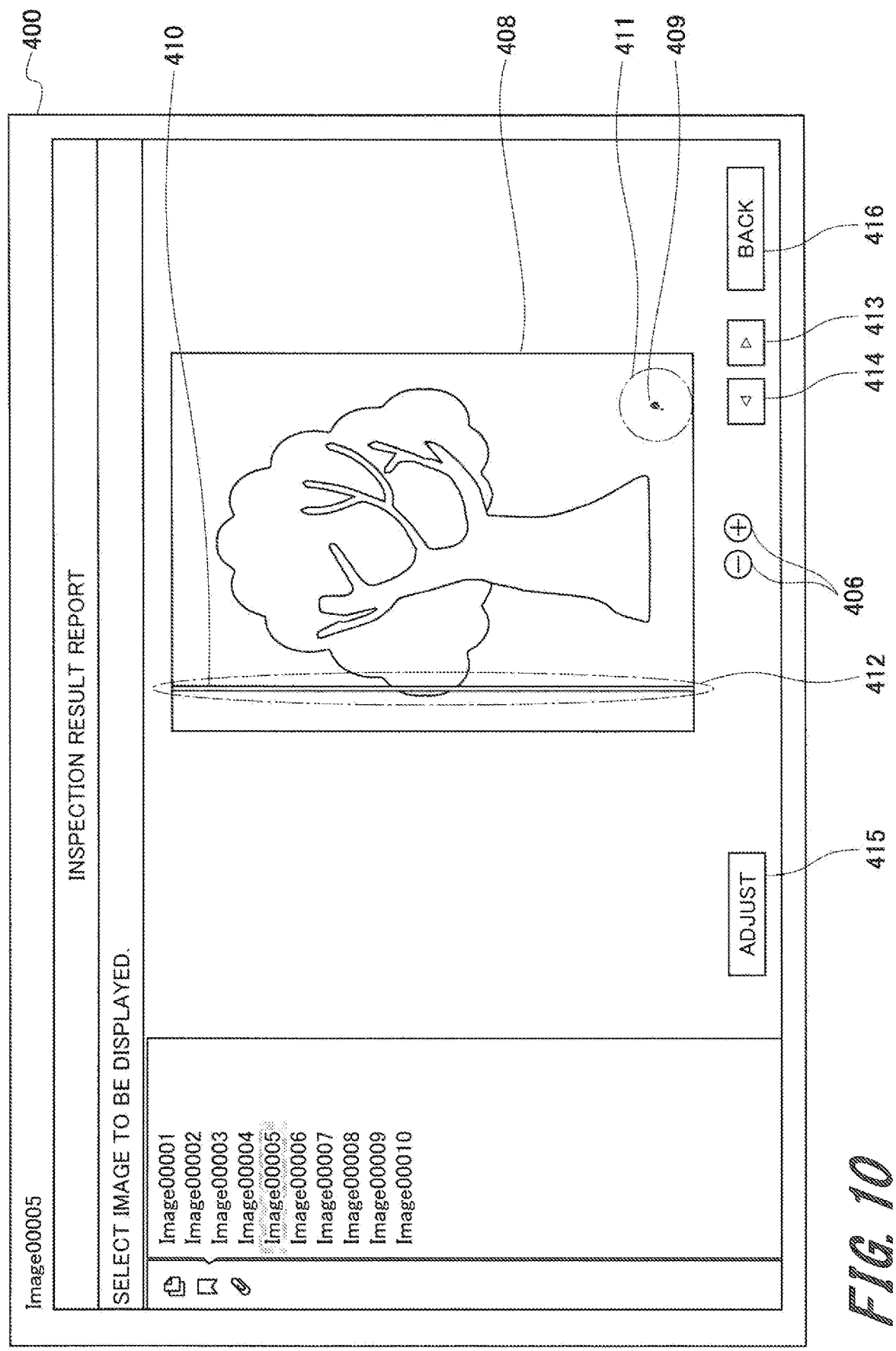
FIG. 10 is an explanatory drawing which shows an example of an inspection result report which displays an abnormal image according to the embodiment of the present invention.

FIG. 10 is an explanatory drawing which shows an example of an inspection result report which displays an abnormal image 408. When the user presses the ABNORMAL IMAGE button 404 in the inspection result report displaying the normal image 407 shown in FIG. 9, the inspection result report as shown in FIG. 10 appears.

Here, the inspection result report output section 127 emphasizes the abnormal spot detected as abnormal by the image inspection section 126 in the abnormal image 408. For example, an abnormality such as a stain or streak is enclosed by a red circle (an example of the first mode) to emphasize it. As shown in FIG. 10, the abnormal image 408 has a stain 409 and a white streak 410 which are enclosed by red circles 411 and 412 respectively.

At the bottom of the inspection result report, the buttons 406 for enlargement and reduction are provided to enlarge or reduce the abnormal image 408. When the "+" button 406 is pressed, the abnormal image 408 is displayed in enlarged form and when the "−" button 406 is pressed, the abnormal image 408 is displayed in reduced form.

At the bottom of the inspection result report, a BACK button 416 is provided to return the display on the screen to the original display. When the BACK button 416 is pressed, the display showing only the normal image 407 in FIG. 9 is restored. By switching the display from the abnormal image 408 to the normal image 407, the abnormal spots can be easily checked.

Alternatively, an operation object image to rotate the abnormal image 408 in the same manner as for the normal image 407 may be provided. When the abnormal image 408 is horizontally displayed, it is larger than when vertically displayed. When the user presses the BACK button 416, the horizontally oriented abnormal image 408 in enlarged form is changed to the horizontally oriented normal image 407 in enlarged form. On the other hand, when the user presses the ABNORMAL IMAGE button 404, the normal image is changed to the horizontally oriented abnormal image 408 in enlarged form. Since the normal image 407 and abnormal image 408 are horizontally oriented in enlarged form in this way, the user can easily check the abnormal spots.

Furthermore, a page forward button 413, a page backward button 414, and an ADJUST button 415 are shown at the bottom of the inspection result report. The page forward button 413 and page backward button 414 will be described later referring to FIG. 11. The ADJUST button 415 will be described later referring to FIG. 13.

Figure 11:
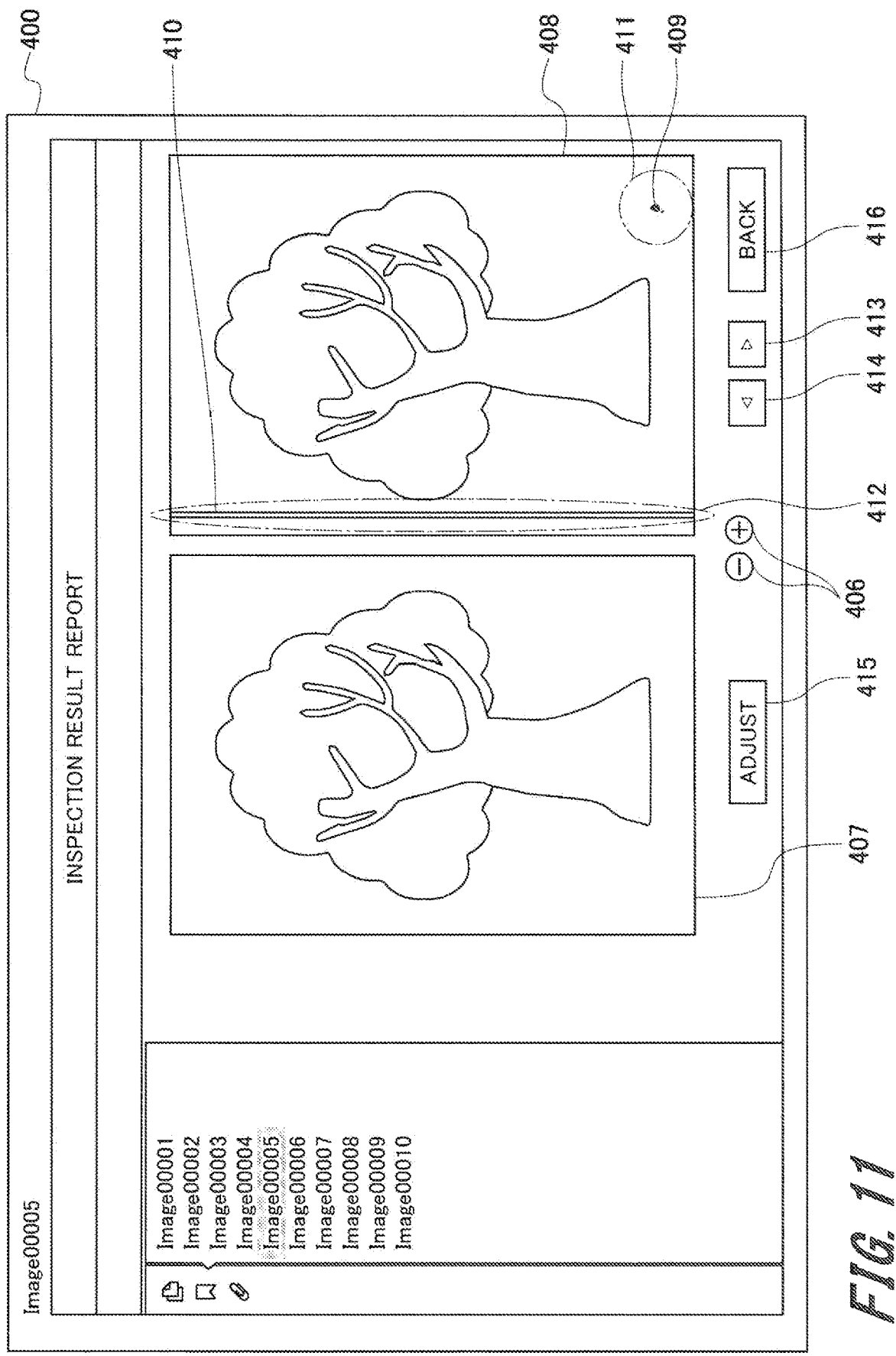
FIG. 11 is an explanatory drawing which shows an example of an inspection result report which displays a normal image and an abnormal image in a comparable manner according to the embodiment of the present invention.

Example of an Inspection Result Report Enabling Comparison Between a Normal Image and an Abnormal Image FIG. 11 is an explanatory drawing which shows an example of an inspection result report which displays the normal image 407 and abnormal image 408 in a comparable manner. When the user presses the ABNORMAL IMAGE COMPARISON button 403 in the inspection result report displaying the normal image 407 as shown in FIG. 9, the inspection result report shown in FIG. 11 appears.

When the ABNORMAL IMAGE COMPARISON button 403 is pressed, the controller 122 instructs the inspection result report output section 127 to display the normal image 407 and abnormal image 408 side by side. According to this instruction, the inspection result report output section 127 displays the normal image 407 and abnormal image 408 side by side. Consequently, the user can easily recognize the type of abnormality and abnormal spots which have caused the abnormality determination made by the image inspection section 126.

In some cases, one read image is linked to a plurality of abnormal images because the image inspection section 126 has determined it as abnormal several times. If that is the case, the inspection result report output section 127 can display the next page or previous page only for the abnormal images, depending on whether the user presses the page forward button 413 or page backward button 414.

For example, the read image 5 of the fifth page shown in FIG. 6 was determined as abnormal twice by the image inspection section 126. Therefore, when the page forward button 413 is pressed, the abnormal image 408 determined as abnormal for the second time is displayed. Conversely, when the page backward button 414 is pressed, the abnormal image 408 determined as abnormal for the first time is displayed.

The enlargement and reduction buttons 406 located under the normal image 407 and abnormal image 408 are used to enlarge or reduce both the normal image 407 and abnormal image 408 at the same scale ratio.

Figure 12:
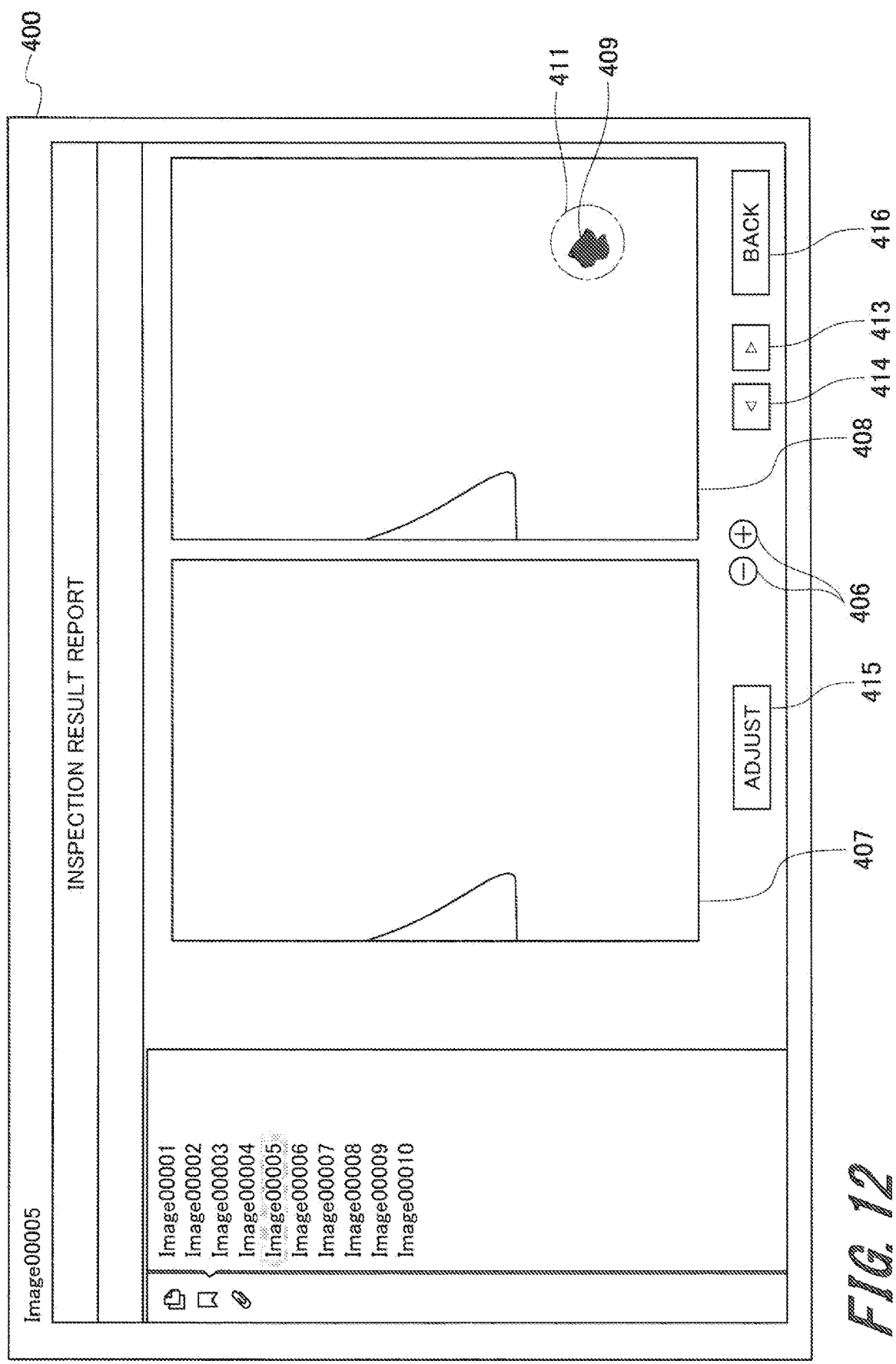
FIG. 12 is an explanatory drawing which shows an example of an inspection result report which displays a normal image and an abnormal image in enlarged form in a comparable manner according to the embodiment of the present invention.

Example of an Inspection Result Report Displaying a Normal Image and an Abnormal Image in Enlarged Form in a Comparable Manner FIG. 12 is an explanatory drawing which shows an example of an inspection result report which displays the normal image 407 and abnormal image 408 in enlarged form in a comparable manner. Since the user has pressed the vicinity of the area enclosed by the red circle 411 in the inspection result report shown in FIG. 11, the vicinity of the area in the image is displayed in enlarged form in the inspection result report.

The inspection result report output section 127 displays both an area including an abnormality spot in the abnormal image 408 and an area corresponding to the abnormality spot in the normal image 407 in enlarged form. Since the abnormal spot in the abnormal image 408 is displayed in enlarged form along with the corresponding spot in the normal image 407, the user can easily recognize the type of abnormality and abnormal spot which have caused the abnormality determination by the image inspection section 126.

Display Example of the Inspection Level Setting Screen

FIG. 13 is an explanatory drawing which shows a display example of the inspection level setting screen. When the user presses the ADJUST button 415 in the inspection result report shown in FIGS. 10 to 12, the inspection level setting screen appears to set the inspection level for the image inspection section 126. The ADJUST button 415 is an example of an operation object image which accepts an instruction from the user.

The inspection level setting part 127b receives an input through the ADJUST button 415 displayed in the inspection result report and sets an inspection level in the controller 122. When the ADJUST button 415 is pressed, the inspection level setting screen appears as shown in FIG. 13. The user can adjust the inspection level for the image inspection section 126 through the inspection level setting screen. For example, if the user checks the abnormal image 408 displayed in the inspection result report and considers the inspection level for the image inspection section 126 too severe, the user can adjust the inspection level through the inspection level setting screen.

As user-adjustable inspection levels, Level 1 to Level 17 are available. If Level 1 is selected, the image inspection section 126 detects the read image as abnormal when the size of a detected stain or scratch is 0.1 mm or more. On the other hand, if Level 7 is selected, the image inspection section 126 detects the read image as abnormal when the size of a detected stain or scratch is 3 mm or more. Thus, when the inspection level number is smaller, the image inspection section 126 detects a smaller stain or scratch as abnormal. Therefore, the user can adjust the inspection level for the image inspection section 126 by pressing a level button among the Level 1 to Level 7 buttons.

Example of an Emphasized Abnormal Spot

Figure 14:
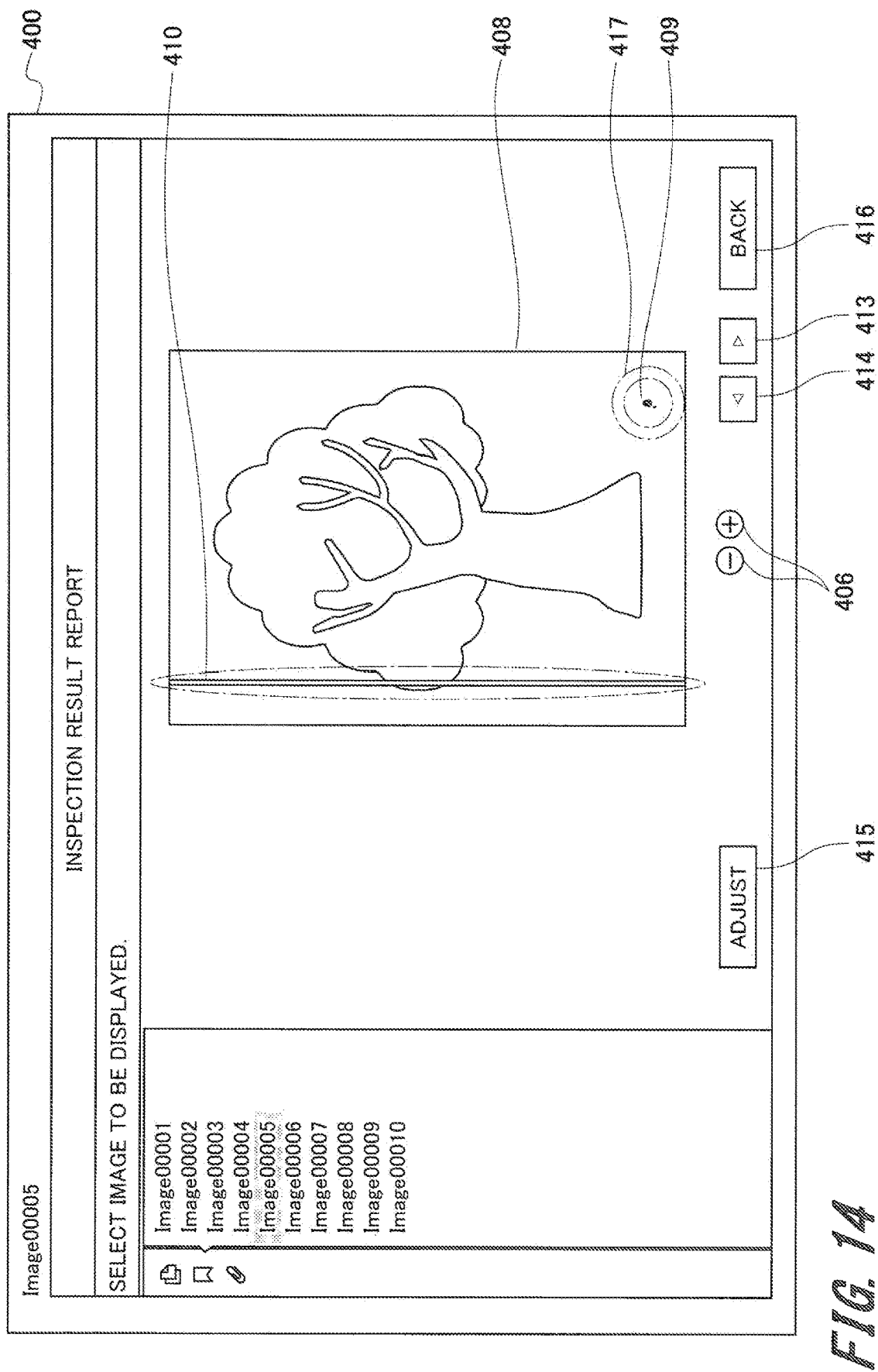
FIG. 14 is an explanatory drawing which shows an example of an emphasized abnormal spot displayed according to the embodiment of the present invention.

FIG. 14 is an explanatory drawing which shows an example of an emphasized abnormal spot. Next, an explanation will be given of an example of the inspection result report which appears after the user presses the ABNORMAL IMAGE button 404 with the normal image 407 displayed as shown in FIG. 9.

If the image inspection section 126 determines the same page of a read image as abnormal several times for the same reason, the inspection result report output section 127 displays the abnormal spot including the abnormality, which is emphasized in a different mode from the mode shown in FIG. 10, for example, by red double circles (an example of the second mode). For example, assuming that one spot in the read image 5 has been determined as abnormal several times, the stain 409 is enclosed by red double circle 417 different from the red circle 411 in FIG. 10 for emphasis. Consequently, the user can easily recognize that the abnormality has occurred several times in the same position of the read image.

Display Example of a Normal Image

Figure 15:
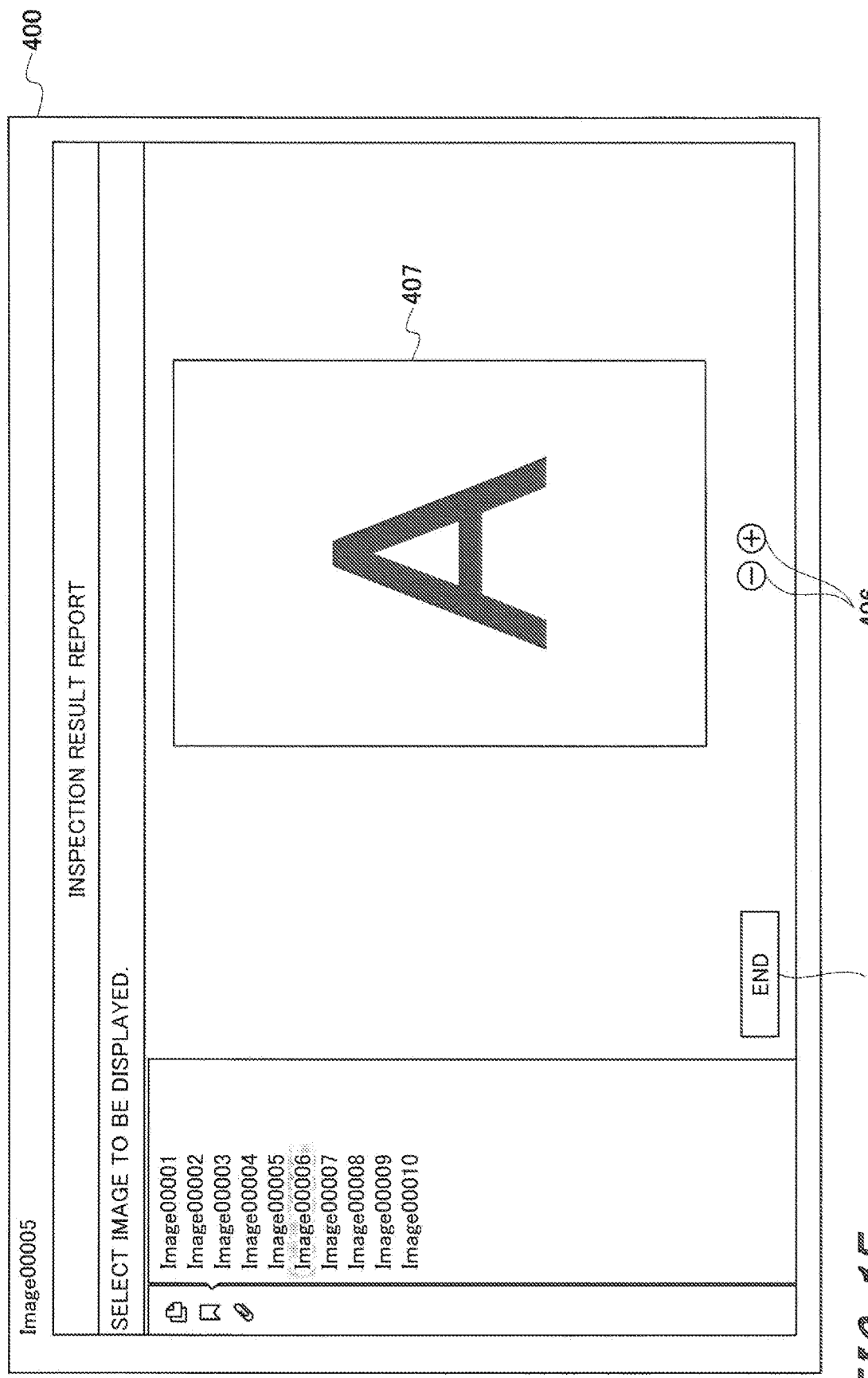
FIG. 15 is an explanatory drawing which shows a display example of a normal image according to the embodiment of the present invention.

FIG. 15 is an explanatory drawing which shows a display example of a normal image. Next, an inspection result report which displays the normal image 407 not linked to the abnormal image 408 will be explained.

When the normal image 407 not linked to the abnormal image 408 is displayed in an inspection result report, the inspection result report output section 127 does not show the ABNORMAL IMAGE COMPARISON button 403 and ABNORMAL IMAGE button 404. This inspection result report shows the normal image 407 not linked to the abnormal image 408, the enlargement and reduction buttons 406 to enlarge and reduce the normal image 407, and the END button 405. When the user presses the END button 405, the inspection result report output section 127 ends the display of the inspection result report.

Display Example of a Comparison Report

Figure 16A:
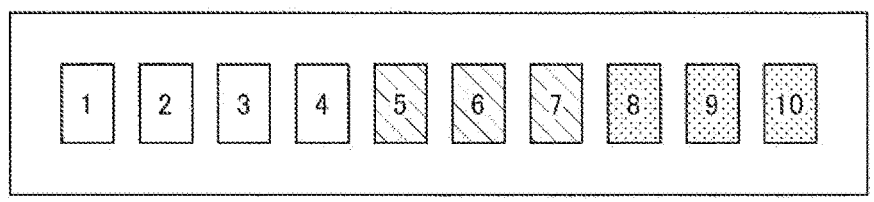
FIG. 16A is a drawing which shows a display example of a report generated by collecting only normal images according to the embodiment of the present invention.
Figure 16B:
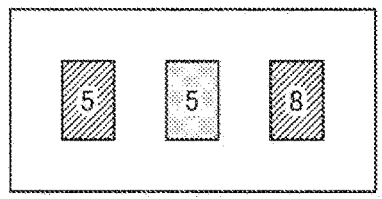
FIG. 16B is a drawing which shows a display example of a report generated by collecting only abnormal images according to the embodiment of the present invention.
Figure 16C:
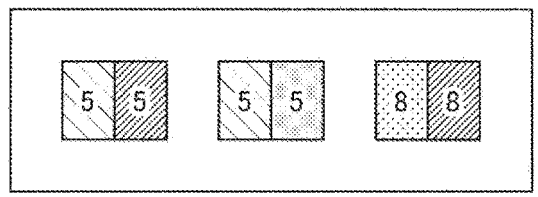
FIG. 16C is a drawing which shows a display example of a report generated by collecting abnormal images and normal images linked to the abnormal images according to the embodiment of the present invention.

FIGS. 16A to 16C are explanatory drawings which show a display example of a comparison report.

In an inspection result report, inspection results can be summarized in a mode other than the inspection result report modes shown in FIGS. 9 to 12. The comparison reports shown in FIGS. 16A to 16C are examples of inspection result reports, which are generated, for example, as electronic files such as PDF (Portable Document Format) files. If an inspection result report is generated as an electronic file, the report can be viewed on the external PC or the like using a USB (Universal Serial Bus) or the like. Next, these reports will be explained using the job shown in FIG. 6.

FIG. 16A shows a report generated by the inspection result report generator 124 collecting only normal images. This report includes the normal images of the first to fourth pages determined as normal by the image inspection section 126 before recovery printing, the normal images of the fifth to seventh pages determined as normal in the second recovery printing, and the normal images of the eighth to tenth pages determined as normal in the third recovery printing.

FIG. 16B shows a report generated by the inspection result report generator 124 collecting only abnormal images. FIG. 16B includes two abnormal images of the fifth page determined as abnormal and one abnormal image of the eighth page.

FIG. 16C shows a report generated by the inspection result report generator 124 collecting abnormal images and normal images linked to the abnormal images. This report is generated so that an abnormal image and a normal image linked to the abnormal image are arranged side by side. For example, the normal image linked to the read image of the fifth page and the abnormal image determined as abnormal for the first time are shown side by side. Also, the normal image linked to the read image 5 of the fifth page and the abnormal image determined as abnormal for the second time are shown side by side. Also, the normal image linked to the read image 8 of the eighth page and the abnormal image are shown side by side. In these abnormal images, the red circles 411 and 412, etc. which emphasize the abnormal spots as explained referring to FIG. 10 may be added.

In the report shown in FIG. 16C, two images (normal image and abnormal image) are shown. The size of the normal and abnormal images in the report shown in FIG. 16C can be reduced to half so that the report size is A4. However, if the normal image and abnormal image whose original size is A4 are reduced in size, the user may hardly discern the small difference between the normal and abnormal images. Therefore, the inspection result report generator 124 generates an inspection result report in which the normal and abnormal images are arranged side by side, keeping the size of the images the same as the read image size. If the size of the normal and abnormal images is A4, preferably the size of the report itself should be A3 or larger so that the size of the normal and abnormal image sizes is unchanged.

Example of Image Inspection of Collated Sets of Printed Sheets

FIGS. 17A to 17C are explanatory drawings which show an example of image inspection of collated sets of printed sheets. In this example, it is assumed that the image forming device 1 executes a job to print images on sheets for a plurality of collated sets. In execution of the job, the first collated set of sheets printed by the image forming device 1 is called "the first set" and a subsequent set of sheets printed by the image forming device 1 is called "the N-th set". FIG. 17A shows the sheets in the first set and FIG. 17B shows the sheets in the N-th set. The read images generated from each set of sheets are inspected by the image inspection section 126. Each set includes ten pages.

In the first set shown in FIG. 17A, read images 1 to 6 are determined as normal by the image inspection section 126. The sheets having the first to sixth page images are delivered to the usual paper delivery tray (normal paper delivery tray). However, the read image 7 is determined as abnormal by the image inspection section 126, so the sheet having the seventh page image determined as abnormal and the sheets having the eighth to tenth page images are treated as spoilage and delivered to the abnormal paper delivery tray. Then, the image forming device 1 starts recovery printing for the seventh and subsequent pages. Then, the read images 7 to 10 are determined as normal by the image inspection section 126 and printing of the first set is thus completed.

In the N-th set shown in FIG. 17B, read images 1 to 4 are determined as normal by the image inspection section 126. Here, the printing result of each page in the N-th set and the inspection result are the same as shown in FIG. 6 and detailed description thereof is omitted.

In the upper part of FIG. 17C, the normal read images determined as normal in the first set are shown in line. In the lower part of FIG. 17C, the abnormal read images determined as abnormal in the N-th set are shown in line. The abnormal images in the N-th set and the corresponding normal images in the first set are linked on a page-by-page basis and stored in the storage 125. In this example, the normal images of the fifth and eighth pages in the first set and the abnormal images in the N-th set are linked and stored in the storage 125.

As mentioned above, even from the printed sheets in different collated sets, the normal image and abnormal image of a page can be linked and stored in the storage 125. The inspection result report output section 127 can output the normal image and abnormal image of a page even from different collated sets in an inspection result report.

Example of Color Inspection of Read Images

Figure 18C:
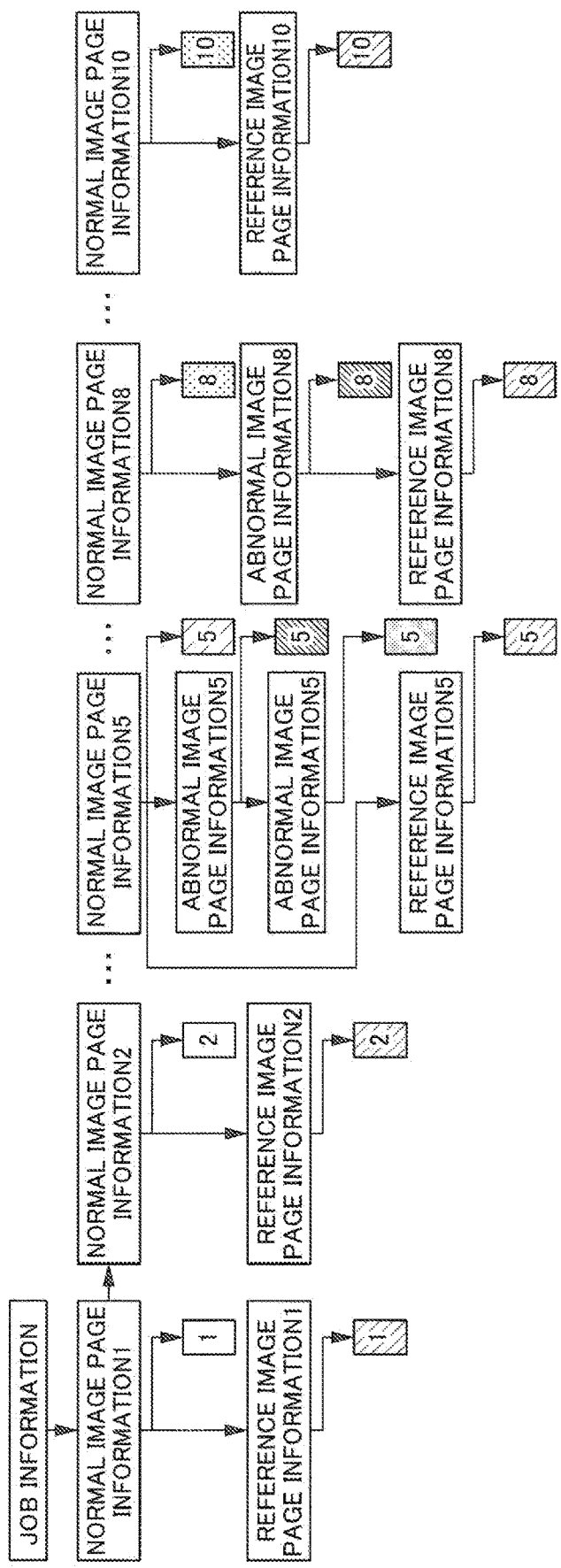
FIG. 18C is a drawing which shows that a reference image, a normal image, and an abnormal image for each page are linked and stored in a storage according to the embodiment of the present invention.

FIGS. 18A to 18C are explanatory drawings which show an example of color inspection of read images, in which a reference image, a normal image, and an abnormal image for each page are linked and stored in the storage 125. When the image inspection section 126 inspects the color of a read image, the reference image generated in the proof mode from the read image by the image reader 129 is linked to the normal image page information and stored.

FIG. 18A shows an example of reference images for ten pages which are generated in the proof mode from read images. For example, reference images 1 to 10 corresponding to the read images 1 to 10 of the first to tenth pages are stored in the storage 125.

FIG. 18B shows an example of the read images of sheets printed in the production printing mode and the sheets treated as spoilage. Here, the printing result of each page and the inspection result are the same as shown in FIG. 6 and detailed description thereof is omitted.

FIG. 18C shows that the inspection result report generator 124 links a reference image, a normal image, and an abnormal image for each page and stores the images in the storage 125. For job information specific to each job, the reference images, normal images, and abnormal images are stored in page numerical order.

The job information holds the address of normal image page information on the read images determined as normal. Each piece of normal image page information (for example, normal image page information 1) holds the address of each piece of reference image page information (for example, reference image page information 1) in the storage 125. Therefore, the inspection result report output section 127 can display an inspection result report in which a reference image and a read image are arranged side by side in a comparable manner.

The reference image can also be used for inspection by the image inspection section 126 in reprinting. In some cases, the setup of the image forming device 1 at the time of storage of the reference image is different from the setup of the image forming device 1 at the time of reprinting due to recalibration, etc. For this reason, the color of images reprinted by the image forming device 1 after alteration of the setup may be different from the color of the reference image. If the inspection items of the image inspection section 126 include color, the user can visually check the color difference easily when the reference image and read image are displayed in a comparable manner.

Therefore, the user can press the ABNORMAL IMAGE COMPARISON button 403 so that the read image and reference image appear in the inspection result report.

Example of the Process to Link Normal Image Page Information and Abnormal Image Page Information Next, among various processes which are performed by the image forming device 1, the process to link normal image page information and abnormal image page information and the process to generate report pages will be described sequentially referring to FIGS. 19 and 20.

FIG. 19 is a flowchart which shows an example of the process to link normal image page information and abnormal image page information.

First, the controller 122 receives a job from the image input section 121. Then, the controller 122 starts the job. As the job is started, the controller 122 compresses the image data received from the image input section 121 using the compression IC 108 and stores the compressed data in the compression memory 111. Then, the controller 122 decompresses the compressed image stored in the compression memory 111 using the decompression IC 109 and stores the decompressed image in the first page memory 112a (S1).

Next, the controller 122 supplies sheets to the image forming section 128 from a paper feed tray or the large capacity paper feeder 20 (S2).

Next, the controller 122 instructs the image forming section 128 to form an image. Upon reception of the instruction from the controller 122, the image forming section 128 performs the printing process to form the image read from the first page memory 112a on a sheet (S3). After the printed sheet is delivered to the reader 30, the image forming section 128 notifies the controller 122 of completion of delivery of the printed sheet.

Next, the image reader 129 reads the image formed on the sheet conveyed from the main unit 10 and stores the read image in the second page memory 112b (S4). Then, the image reader 129 notifies the controller 122 of completion of reading.

Next, the controller 122 instructs the image inspection section 126 to inspect the read image. At this time, the image inspection section 126 inspects the read image read from the second page memory 112b (S5). Then, if the image inspection section 126 determines that the read image does not have an abnormality, it notifies the controller 122 of the inspection result "normal". On the other hand, if the image inspection section 126 determines that the read image has an abnormality, it notifies the controller 122 of the inspection result including the detected abnormal spot.

Next, the controller 122 stores the inspection result of the read image inspected by the image inspection section 126 in the storage 125 (S6). The controller 122 determines whether the read image has an abnormality or not, according to the inspection result from the image inspection section 126 (S7). If the read image is determined to have an abnormality (YES at S7), the controller 122 stores the address of the read image (abnormal image) in the storage 125 in the abnormal image page information (S8).

On the other hand, if the read image is determined not to have an abnormality (NO at S7), the controller 122 stores the address of the read image (normal image) in the storage 125 in the normal image page information (S9).

Next, the controller 122 determines whether the printing process performed by the image forming section 128 is recovery printing or not (S10). If the controller 122 determines that the process is recovery printing (YES at S10), it links the page information of the recovery-printed image to the page information of the same image determined as abnormal before recovery printing (S11) and goes to Step S12. On the other hand, if the controller 122 determines that the process is not recovery printing (NO at S10), it goes to Step S12.

Next, the controller 122 determines whether the inspection result of the image inspection section 126 concerns the read image from the image printed on the last page sheet (S12).

If the controller 122 determines that the inspection result does not concern the last page (NO at S12), it goes back to Step S2 in order to continue the image forming process for the next and subsequent pages, and causes the image forming section 128 to continue the image forming process. On the other hand, if the controller 122 determines that the inspection result concerns the last page (YES at S12), this processing sequence is ended. With these steps, the process to link the normal image page information and abnormal image page information is completed.

Example of the Process to Generate an Inspection Result Report

Figure 20:
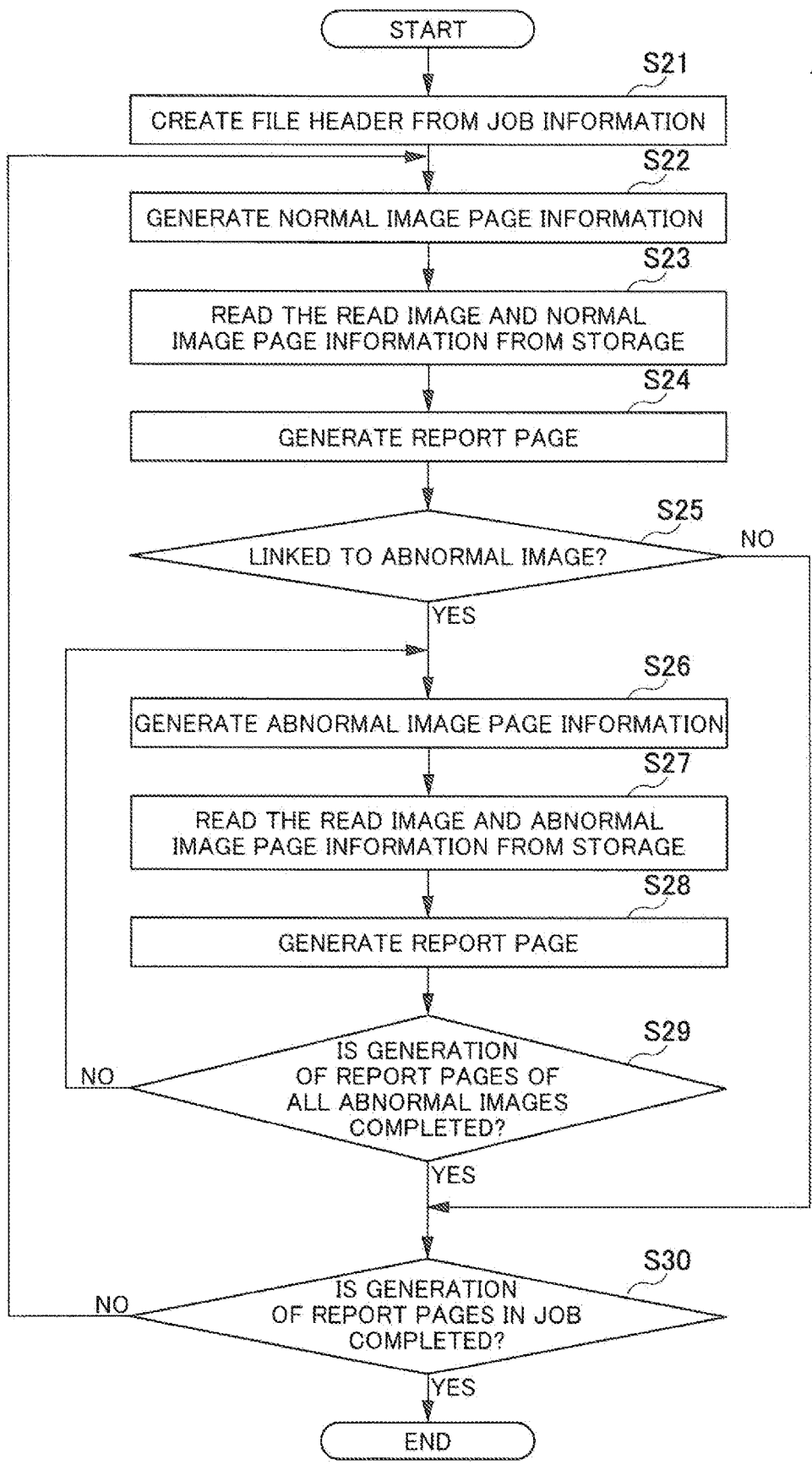
FIG. 20 is a flowchart which shows an example of the process to generate an inspection result report according to the embodiment of the present invention.

FIG. 20 is a flowchart which shows an example of the process to generate an inspection result report.

First, the controller 122 instructs the inspection result report generator 124 to generate an inspection result report. The inspection result report generator 124 creates a file header for an inspection result report according to job information (S21). As mentioned above, the file header at least holds information on the number of pages of the job (the number of normal images) and the total number of pages (the total number of pages including abnormal images).

Next, the inspection result report generator 124 generates normal image page information as shown in FIG. 8 according to the job information. As mentioned above, the normal image page information holds the read image normality or abnormality determination and read image size (vertical, horizontal). Also, the normal image page information holds information on read image resolution, read image tone, abnormal image linkage and so on (S22).

The inspection result report generator 124 reads the read image and normal image page information from the storage 125 (S23) and generates a report page for the normal image according to the read image and normal image page information (S24).

Next, the inspection result report generator 124 determines whether there is information on linkage of the normal image and abnormal image or not, according to the job information (S25). If the inspection result report generator 124 determines that there is no information on linkage to an abnormal image (NO at S25), it goes to Step S30.

On the other hand, if the inspection result report generator 124 determines that there is information on linkage to an abnormal image (YES at S25), it generates abnormal image page information according to the job information (S26). The abnormal image page information holds information on the read image normality or abnormality determination by the image inspection section 126, read image size (vertical, horizontal), read image resolution, read image tone, abnormal image linkage and so on. Also, the abnormal image page information holds information on the number of detected abnormalities, type of abnormality, and the coordinates of abnormal spots.

Next, the inspection result report generator 124 reads the read image and abnormal image page information from the storage 125 (S27). Next, the inspection result report generator 124 generates a report page according to the read image and abnormal image page information (S28). This report page is generated after the normal image page information for the same page.

Next, the inspection result report generator 124 determines whether generation of report pages of all abnormal images for the same page is completed or not (S29). If the inspection result report generator 124 determines that generation of report pages of all abnormal images for the same page is not completed (NO at S29), it goes back to Step S26. Then, the inspection result report generator 124 continues generation of report pages of other abnormal images.

On the other hand, if the inspection result report generator 124 determines that generation of report pages of all abnormal images for the same page is completed (YES at S29), it determines whether generation of report pages of read images for all the pages in the job is completed or not (S30).

If the inspection result report generator 124 determines that generation of report pages of read images for all the pages in the job is not completed (NO at S30), it goes back to Step S22. On the other hand, if the inspection result report generator 124 determines that generation of report pages of read images for all the pages in the job is completed (YES at S30), the processing sequence is ended. The inspection result report is completed by repeating the generation of a report page for each page as mentioned above.

In the image forming device 1 according to the present embodiment as described so far, the image inspection section 126 inspects the read image generated by the image reader 129 reading a sheet, and determines whether each page is normal or abnormal. The image inspection section 126 outputs an inspection result of determination of normality or abnormality depending on whether the read image of each page has an abnormality or not. Then, the inspection result report generator 124 generates an inspection result report with report pages for each page according to the output inspection result. If the read image of a page was determined as abnormal before being determined as normal, the abnormal image and normal image are linked in the report page. Consequently, the inspection result report output section 127 can output the inspection result report according to the inspection result report in a manner to enable comparison.

In the conventional process of generating a defect detection report, a read image (defect-detected image) and a normal image (original image) are formed again on sheets, so another abnormality such as a stain may be added to the sheet on which the image has been formed. In this case, it is impossible to determine whether the abnormality added to the defect detection report is the abnormality contained in the original read image or an abnormality caused by generation of the defect detection report. In contrast, in the inspection result report according to the present embodiment, the normal image and abnormal image are displayed side by side by the inspection result report output section 127. Therefore, it is different from the defect detection report disclosed in Patent Literature 1, which is a report printed by forming the read image (defect-detected image) and normal image (original image) on sheets again. The inspection result report output section 127 can display the abnormal image linked to the normal image in the inspection result report in response to a request from the user. Consequently, the user can check the abnormality contained in the abnormal image and easily know the page number, etc. of the read image determined as abnormal.

In the inspection result report displayed on the screen, when the ABNORMAL IMAGE COMPARISON button 403 is pressed, the normal image and abnormal image are displayed side by side. Since the normal image and abnormal image are displayed in a comparable manner, the user can easily recognize a stain or streak in the read image. Furthermore, when the ABNORMAL IMAGE button 404 is pressed, the normal image and abnormal image are switched for display. Therefore, the user can easily recognize an abnormal spot. Furthermore, when the area around the abnormal spot in the displayed abnormal image is touched, the vicinity of the touched area is displayed in enlarged form in the inspection result report, so the user can easily recognize the cause of abnormality.

Furthermore, since the reference image generated in the proof mode and the read image can be displayed in a comparable manner, it is easier to determine whether the color of the read image is normal or not with respect to the reference image. In other words, when the reference image and read image are displayed in a comparable manner, the user can make an inspection in consideration of the color of the read image easily.

The present invention is not limited to the above embodiment. Obviously, the invention may be embodied and applied in other various ways without departing from the gist of the present invention as described in the appended claims.

For example, in the above embodiment, the device and system configurations have been described in detail and concretely for easy understanding of the present invention; however, the present invention is not limited to a configuration which includes all the elements described above. An element of the abovementioned embodiment may be replaced by an element of another embodiment or an element of one embodiment may be added to another embodiment. For each embodiment, addition, deletion, or replacement of an element can be made.

The control lines and data lines shown herein are those considered as required for explanation and do not cover all the control lines and data lines in the product. It may be considered that almost all constituent elements are connected to each other actually.

Although the embodiment of the present invention has been described and illustrated in detail, the disclosed embodiment is made for purposes of illustration and example only and not limitation. The scope of the present invention should be interpreted by terms of the appended claims.

REFERENCE SIGNS LIST

1 . . . image forming device,
30 . . . image inspection device,
40 . . . after-treatment section,
122 . . . controller,
124 . . . inspection result report generator,
125 . . . storage,
126 . . . image inspection section,
127 . . . inspection result report output section,
129 . . . image reader

What is claimed is:

1. An image inspection device comprising:
a hardware processor configured to perform an inspection to determine whether or not a read image has an abnormality, and display the read image on a display, the read image having been generated by reading a recording material on which an image has been formed, wherein
the hardware processor i) performs a plurality of types of inspection to determine whether or not a read image has an abnormality, and ii) for predetermined types of inspection of the plurality of types of inspection, displays, on the display, together with the read image that has been determined to have the abnormality, information with which a user compares the read image that has been determined to have the abnormality.

2. The image inspection device according to claim 1, wherein the hardware processor displays, on the display, the read image that has been determined to have the abnormality, when a request has been received from the user to display, on the display, the read image that has been determined to have the abnormality.

3. The image inspection device according to claim 2, wherein the hardware processor displays an enlarged image on the display, the enlarged image being an enlarged image of a partial area of the read image that has been determined to have the abnormality and displayed on the display.

4. The image inspection device according to claim 3, wherein the hardware processor displays an enlarged image on the display, the enlarged image being an enlarged image of an area including an abnormal spot of the read image that has been determined to have the abnormality and displayed on the display.

5. The image inspection device according to claim 3, wherein the hardware processor displays the enlarged image based on a first operation of the user.

6. The image inspection device according to claim 5, wherein the hardware processor displays, on the display, an enlargement button for displaying the read image that has been determined to have the abnormality and displayed on the display, while being enlarged, and displays the enlarged image, on the display, when a second operation of the user to depress the enlargement button, that is an operation different from the first operation of the user, has been performed.

7. The image inspection device according to claim 5, wherein the first operation of the user is an operation to touch the read image that has been displayed on the display.

8. The image inspection device according to claim 5, wherein the hardware processor switches the read image that has been determined to have the abnormality and displayed on the display to the enlarged image, and displays the enlarged image on the display, based on the first operation of the user.

9. An image inspection method to be performed in an image inspection device, the image inspection device configured to perform an inspection to determine whether or not a read image has an abnormality, and display the read image on a display, the read image having been generated by reading a recording material on which an image has been formed, the method comprising:

a procedure of performing a plurality of types of inspection to determine whether or not a read image has an abnormality; and a procedure of displaying, on the display, together with the read image that has been determined to have the abnormality, information with which a user compares the read image that has been determined to have the abnormality, for predetermined types of inspection of the plurality of types of inspection.

10. The image inspection method according to claim 9, wherein a procedure of displaying, on the display, the read image that has been determined to have the abnormality, is performed, when a request has been received from the user to display, on the display, the read image that has been determined to have the abnormality.

11. The image inspection method according to claim 10, the method further comprising a procedure of displaying an enlarged image on the display, the enlarged image being an enlarged image of a partial area of the read image that has been determined to have the abnormality and displayed on the display.

12. The image inspection method according to claim 10, the method further comprising a procedure of displaying an enlarged image on the display, the enlarged image being an enlarged image of an area including an abnormal spot of the read image that has been determined to have the abnormality and displayed on the display.

13. The image inspection method according to claim 12, wherein the procedure of displaying the enlarged image is performed based on a first operation of the user.

14. The image inspection method according to claim 13, the method further comprising a procedure of displaying, on the display, an enlargement button for displaying the read image that has been determined to have the abnormality and displayed on the display, while being enlarged, wherein the procedure of displaying the enlarged image, on the display, is performed, when a second operation of the user to depress the enlargement button, that is an operation different from the first operation of the user, has been performed.

15. The image inspection method according to claim 13, wherein the first operation of the user is an operation to touch the read image that has been displayed on the display.

16. The image inspection method according to claim 13, the method further comprising a procedure of switching the read image that has been determined to have the abnormality and displayed on the display to the enlarged image, and displaying the enlarged image on the display, based on the first operation of the user.

17. A non-transitory computer-readable recording medium storing an image inspection method to be performed by a computer in an image inspection device, the image inspection device configured to perform an inspection to determine whether or not a read image has an abnormality, and display the read image on a display, the read image having been generated by reading a recording material on which an image has been formed, the image inspection method comprising:

a procedure of performing a plurality of types of inspection to determine whether or not a read image has an abnormality; and a procedure of displaying, on the display, together with the read image that has been determined to have the abnormality, information with which a user compares the read image that has been determined to have the abnormality, for predetermined types of inspection of the plurality of types of inspection.

18. The computer-readable recording medium according to claim 17, wherein a procedure of displaying, on the display, the read image that has been determined to have the abnormality, is performed, when a request has been received from the user to display, on the display, the read image that has been determined to have the abnormality.

19. The computer-readable recording medium according to claim 18, the method further comprising a procedure of displaying an enlarged image on the display, the enlarged image being an enlarged image of a partial area of the read image that has been determined to have the abnormality and displayed on the display.

20. The computer-readable recording medium according to claim 18, the method further comprising a procedure of displaying an enlarged image on the display, the enlarged image being an enlarged image of an area including an abnormal spot of the read image that has been determined to have the abnormality and displayed on the display.

21. The computer-readable recording medium according to claim 20, wherein the procedure of displaying the enlarged image is performed based on a first operation of the user.

22. The computer-readable recording medium according to claim 21, the method further comprising a procedure of displaying, on the display, an enlargement button for displaying the read image that has been determined to have the abnormality and displayed on the display, while being enlarged, wherein the procedure of displaying the enlarged image, on the display, is performed, when a second operation of the user to depress the enlargement button, that is an operation different from the first operation of the user, has been performed.

23. The computer-readable recording medium according to claim 21, wherein the first operation of the user is an operation to touch the read image that has been displayed on the display.

24. The computer-readable recording medium according to claim 21, the method further comprising a procedure of switching the read image that has been determined to have the abnormality and displayed on the display to the enlarged image, and displaying the enlarged image on the display, based on the first operation of the user.

* * * * *